(12) United States Patent
Kaino et al.

(10) Patent No.: US 11,189,042 B2
(45) Date of Patent: Nov. 30, 2021

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Akihiko Kaino, Kanagawa (JP); Masashi Eshima, Chiba (JP); Daiki Yamanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/632,159

(22) PCT Filed: May 7, 2018

(86) PCT No.: PCT/JP2018/017638
§ 371 (c)(1),
(2) Date: Jan. 17, 2020

(87) PCT Pub. No.: WO2019/021569
PCT Pub. Date: Jan. 31, 2019

(65) Prior Publication Data
US 2020/0226774 A1    Jul. 16, 2020

(30) Foreign Application Priority Data
Jul. 26, 2017    (JP) .............................. JP2017-144361

(51) Int. Cl.
*G06T 7/55*    (2017.01)
*G06T 7/73*    (2017.01)
(Continued)

(52) U.S. Cl.
CPC .............. *G06T 7/55* (2017.01); *G06K 9/3233* (2013.01); *G06K 9/4604* (2013.01); *G06T 7/60* (2013.01); *G06T 7/73* (2017.01)

(58) Field of Classification Search
CPC ..... G06T 7/10; G06T 7/11; G06T 7/12; G06T 7/13; G06T 7/50; G06T 7/536;
(Continued)

(56) References Cited

U.S. PATENT DOCUMENTS

| 2011/0050854 A1* | 3/2011 | Kanamori et al. ........ G06T 7/55 348/46 |
| 2012/0075432 A1* | 3/2012 | Bilbrey et al. ......... H04N 13/25 348/48 |

(Continued)

FOREIGN PATENT DOCUMENTS

| JP | 2010-279044 A | * 12/2010 | ............ H04N 13/02 |
| JP | 2015-115041 A | *  6/2015 | ............... G06T 7/00 |

(Continued)

*Primary Examiner* — Andrew W Johns
(74) *Attorney, Agent, or Firm* — Paratus Law Group, PLLC

(57) ABSTRACT

There is provided an information processing device to enable a three-dimensional shape of an object in a real space to be estimated in a more preferred manner, the information processing device including: a division unit configured to divide, into one or more regions, an image plane corresponding to a viewing point in a real space on which geometric structure information is mapped in accordance with distribution of the geometric structure information; an acquisition unit configured to acquire orientation information indicating at least one of a position and an orientation of the viewing point; an extracting unit configured to extract, as a region of interest, at least part of the regions obtained by dividing the image plane; and an estimation unit configured to estimate a shape of an object in the real space based on the geometric structure information in regions of interest on image planes respectively corresponding to a plurality of different viewing points associated with each other among the viewing points, wherein the geometric structure information is information corresponding to a detection result of each of a plurality of
(Continued)

pieces of polarized light having different polarization directions.

15 Claims, 13 Drawing Sheets

(51) Int. Cl.
*G06K 9/32* (2006.01)
*G06K 9/46* (2006.01)
*G06T 7/60* (2017.01)

(58) Field of Classification Search
CPC .... G06T 7/55; G06T 7/60; G06T 7/70; G06T 7/73; G06T 7/97; G06K 9/3233; G06K 9/34; G06K 9/46; G06K 9/4604
See application file for complete search history.

(56) References Cited

U.S. PATENT DOCUMENTS

| | | | |
|---|---|---|---|
| 2016/0267348 A1* | 9/2016 | Kondo | G06K 9/4671 |
| 2018/0107108 A1* | 4/2018 | Nakatani et al. | G06T 7/00 |
| 2018/0122086 A1* | 5/2018 | Lu et al. | G06T 7/73 |
| 2018/0227579 A1* | 8/2018 | Shen et al. | H04N 19/124 |

FOREIGN PATENT DOCUMENTS

| | | | | |
|---|---|---|---|---|
| JP | 2018-41278 A | * | 3/2018 | G06T 7/00 |
| WO | WO 2016/174915 A1 | * | 11/2016 | G06F 3/01 |
| WO | WO 2016/181687 A1 | * | 11/2016 | G06T 7/20 |

* cited by examiner

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2018/017638 (filed on May 7, 2018) under 35 U.S.C. § 371, which claims priority to Japanese Patent Application No. 2017-144361 (filed on Jul. 26, 2017), which are all hereby incorporated by reference in their entirety.

FIELD

The present disclosure relates to an information processing device, an information processing method, and a computer program.

BACKGROUND

In recent years, as an image recognition technique is sophisticated, it becomes possible to three-dimensionally estimate (or measure) a position, an orientation, a shape, and the like of an object in a real space (hereinafter, also referred to as a "real object") based on an image taken by an imaging unit such as a digital camera. Additionally, by utilizing such an estimation result, a three-dimensional shape of the real object has been enabled to be reproduced (reconstructed) as a model using a polygon and the like.

As an application of the technique described above, it has been enabled to estimate (recognize) a position or an orientation (that is, a self-position) in a real space of a predetermined viewing point such as an imaging unit that takes an image of a real object. For example, Patent Literature 1 discloses an example of a technique of utilizing, for estimating a self-position, three-dimensional shape data reproducing a three-dimensional shape of an object as a model.

CITATION LIST

Patent Literature

Patent Literature 1: JP 2011-203824 A

SUMMARY

Technical Problem

On the other hand, in the processing related to estimation of a three-dimensional shape of an object described above, a processing load is typically high, and a data amount of data reproducing the three-dimensional shape in accordance with the estimation result (for example, data obtained by modeling the three-dimensional shape) tends to be further increased. Additionally, with a conventional method, a physical boundary may be difficult to be recognized, and as a result, accuracy in estimating the three-dimensional shape of the object may be lowered in some cases.

Thus, the present disclosure discloses a technique of enabling a three-dimensional shape of an object in a real space to be estimated in a more preferred manner.

Solution to Problem

According to the present disclosure, an information processing device is provided that includes: a division unit configured to divide, into one or more regions, an image plane corresponding to a viewing point in a real space on which geometric structure information is mapped in accordance with distribution of the geometric structure information; an acquisition unit configured to acquire orientation information indicating at least one of a position and an orientation of the viewing point; an extracting unit configured to extract, as a region of interest, at least part of the regions obtained by dividing the image plane; and an estimation unit configured to estimate a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions.

According to the present disclosure, an information processing method performed by a computer is provided that includes: dividing an image plane on which geometric structure information is mapped into one or more regions in accordance with distribution of the geometric structure information; acquiring orientation information indicating at least one of a position and an orientation of a viewing point for the viewing point in a real space; extracting at least part of the regions obtained by dividing the image plane as a region of interest; and estimating a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions at the viewing point.

According to the present disclosure, a computer program is provided that causes a computer to execute: dividing an image plane on which geometric structure information is mapped into one or more regions in accordance with distribution of the geometric structure information; acquiring orientation information indicating at least one of a position and an orientation of a viewing point for the viewing point in a real space; extracting at least part of the regions obtained by dividing the image plane as a region of interest; and estimating a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions at the viewing point.

Advantageous Effects of Invention

As described above, the present disclosure discloses a technique of enabling a three-dimensional shape of an object in a real space to be estimated in a more preferred manner.

The effect described above is not a limitation, and any effect disclosed herein or another effect that may be grasped herein may be exhibited in addition to the effect described above, or in place of the effect described above.

DESCRIPTION OF EMBODIMENTS

Figure 1:
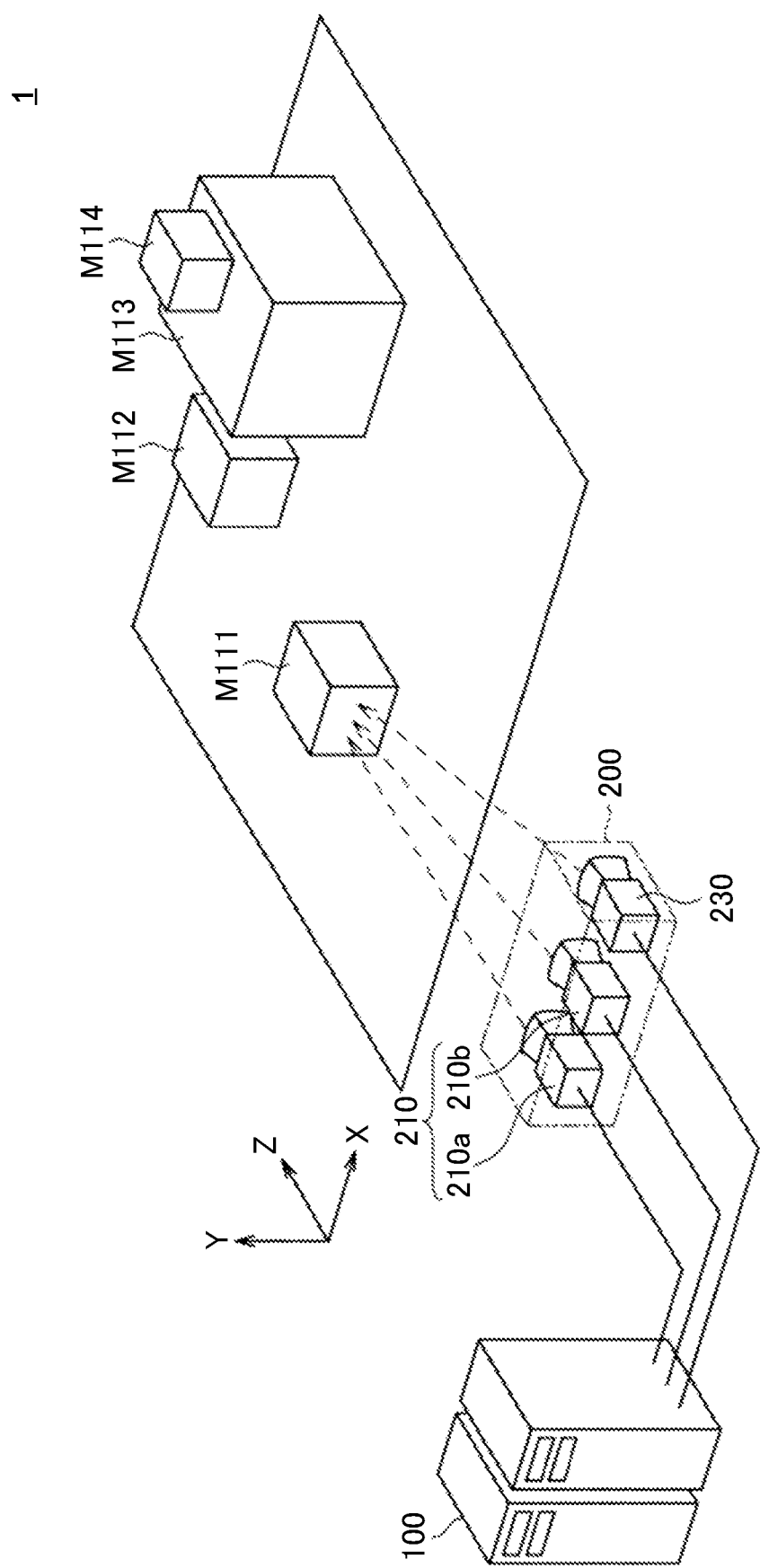
FIG. 1 is an explanatory diagram for explaining an example of a schematic system configuration of an information processing system according to an embodiment.

The following describes a preferred embodiment of the present disclosure in detail with reference to the attached drawings. In the present description and the drawings, constituent elements having substantially the same functional configuration are denoted by the same reference numeral, and redundant description will not be repeated.

Description will be made in the following order.
1. Schematic configuration
2. Examination for estimation of three-dimensional shape
3. Technical feature
   3.1. Functional configuration
   3.2. Processing
   3.3. Modification
4. Hardware configuration
5. Application example
6. Conclusion

1. SCHEMATIC CONFIGURATION

First, the following describes an example of a schematic system configuration of an information processing system 1 according to the present embodiment with reference to FIG. 1. FIG. 1 is an explanatory diagram for explaining an example of the schematic system configuration of the information processing system 1 according to the embodiment.

As illustrated in FIG. 1, the information processing system 1 according to the embodiment includes an information acquisition device 200 and an information processing device 100. The information processing device 100 and the information acquisition device 200 are configured to be able to transmit/receive information to/from each other via a predetermined network, for example. A type of the network that connects the information processing device 100 with the information acquisition device 200 is not limited. By way of specific example, the network may be constituted of what is called a wireless network such as a network based on a standard such as LTE and Wi-Fi (registered trademark). The network may also be constituted of the Internet, a private line, a Local Area Network (LAN), a Wide Area Network (WAN), or the like. The network may include a plurality of networks, and at least part thereof may be configured as a wired network.

In FIG. 1, the reference numerals M111 to M114 schematically denote objects (real objects) positioned in a real space.

The information acquisition device 200 is configured to be able to move in the real space. By way of specific example, the information acquisition device 200 may be configured to be portable like what is called a wearable device, a smartphone, and the like. In this case, when a user moves while carrying the information acquisition device 200, the information acquisition device 200 moves in the real space. The information acquisition device 200 may be configured to be able to move itself like a mobile object such as a vehicle.

As illustrated in FIG. 1, the information acquisition device 200 includes a depth sensor 210 and a polarization sensor 230.

The depth sensor 210 acquires information for estimating a distance between a predetermined viewing point and an object positioned in the real space, and transmits the acquired information to the information processing device 100. In the following description, information for estimating the distance between the predetermined viewing point and the object positioned in the real space, which is acquired by the depth sensor 210, is also referred to as "depth information".

For example, in the example illustrated in FIG. 1, the depth sensor 210 is configured as what is called a stereo camera including a plurality of imaging units 210a and 210b, and takes an image (optical image) of the object positioned in the real space from different viewing points with the imaging units 210a and 210b. In this case, the depth sensor 210 transmits, to the information processing device 100, images (for example, stereo images) respectively taken by the imaging units 210a and 210b.

By utilizing the images taken from the different viewing points as described above, for example, the distance between the predetermined viewing point (for example, the position of the information acquisition device 200 in the real space) and a subject (that is, the imaged real object in the image) can be estimated (calculated) based on parallax between the images. Thus, for example, it becomes possible to generate what is called a depth map in which an estimation result of the distance between the predetermined viewing point and the subject is mapped on an imaging plane.

A configuration of a portion corresponding to the depth sensor 210 and a method related to estimation of the distance are not limited so long as the distance between the predetermined viewing point and the object (real object) in the real space can be estimated. By way of specific example, the distance between the predetermined viewing point and the real object may be measured based on a scheme such as a multi-camera stereo, movement parallax, Time Of Flight (TOF), and Structured Light. In this case, the TOF is a scheme of projecting light such as infrared rays on the subject (that is, the real object), and measuring, for each pixel, a time from when the projected light is reflected by the subject until the light is returned to obtain an image including a distance (depth) to the subject (that is, a depth map) based on the measurement result. The Structured Light is a scheme of irradiating the subject with a pattern of light such as infrared rays to be imaged, and obtaining a depth map including the distance (depth) to the subject based on a change in the pattern obtained from an imaging result. The movement parallax is a method of measuring the distance to the subject based on parallax even with what is called a monocular camera. Specifically, the subject is imaged from different viewing points by moving the camera, and the distance to the subject is measured based on parallax between taken images. In this case, by recognizing a moving distance and a moving direction of the camera with various sensors, the distance to the subject can be measured more accurately. The configuration of the depth sensor 210 (for example, a monocular camera, a stereo camera, and the like) may be changed in accordance with a measuring method for a distance.

The polarization sensor 230 detects light that is polarized in a predetermined polarization direction (hereinafter, also simply referred to as "polarized light") from the light reflected by the object positioned in the real space, and transmits information corresponding to a detection result of the polarized light to the information processing device 100. In the information processing system 1 according to the embodiment, the polarization sensor 230 is configured to be able to detect a plurality of pieces of polarized light the polarization directions of which are different from each other. In the following description, information corresponding to the detection result of the polarized light obtained by the polarization sensor 230 is also referred to as "polarized information".

By way of specific example, the polarization sensor 230 is configured as what is called a polarization camera, and takes a polarized image based on light polarized in a predetermined polarization direction. In this case, the polarized image corresponds to information in which the polarized information is mapped on an imaging plane (in other words, an image plane) of the polarization camera. In this case, the polarization sensor 230 transmits the taken polarized image to the information processing device 100.

The polarization sensor 230 may be held to be able to image polarized light coming from a region at least the part of which is superimposed on (ideally, substantially matches with) a region in the real space from which information for estimating a distance is acquired by the depth sensor 210. In a case in which the depth sensor 210 and the polarization sensor 230 are respectively fixed at predetermined positions, the respective positions may be treated as known information by previously acquiring information that indicates the respective positions of the depth sensor 210 and the polarization sensor 230 in the real space.

In the example illustrated in FIG. 1, the depth sensor 210 and the polarization sensor 230 are held by the same device (that is, the information acquisition device 200), but the configuration is not limited thereto. By way of specific example, the depth sensor 210 and the polarization sensor 230 may be disposed in devices different from each other. In this case, it is preferable that a region in the real space from which the information is acquired by the depth sensor 210 is superimposed on a region in the real space from which the information (polarized light) is acquired by the polarization sensor 230, and a relative positional relation between the depth sensor 210 and the polarization sensor 230 can be recognized.

In the information processing system 1 according to the embodiment, the position and the orientation of the information acquisition device 200 in the real space may be estimated by applying a technique of what is called self-position estimation.

The following describes a technique called simultaneous localization and mapping (SLAM) as a more specific example of the technique of estimating a position and an orientation of a predetermined device in the real space. The SLAM is a technique of performing self-position estimation and creation of an environment map at the same time by utilizing an imaging unit such as a camera, various sensors, an encoder, and the like. By way of more specific example, in the SLAM (specifically, Visual SLAM), a three-dimensional shape of an imaged scene (or subject) is successively restored based on a moving image taken by the imaging unit. By associating a restoration result of the imaged scene with a detection result of the position and the orientation of the imaging unit, a map of surrounding environment is created, and the position and the orientation of the imaging unit in the environment are estimated. For example, by disposing various sensors such as an acceleration sensor and an angular speed sensor in a device holding the imaging unit, the position and the orientation of the imaging unit can be estimated as information that indicates a relative change based on a detection result obtained by the sensors. Obviously, the method is not limited to a method based on the detection result obtained by various sensors such as an acceleration sensor and an angular speed sensor so long as the position and the orientation of the imaging unit can be estimated.

The information processing device 100 acquires the depth information from the depth sensor 210, and estimates at least one of the position and the orientation of a predetermined viewing point (for example, the information acquisition device 200) based on the acquired depth information. In the following description, information corresponding to an estimation result of at least one of the position and the orientation of a predetermined line of sight is also referred to as "orientation information". That is, in the following description, in a case of writing "orientation information of a predetermined viewing point", the orientation information is assumed to include information corresponding to the estimation result of at least one of the position and the orientation of the viewing point.

The information processing device 100 also acquires the polarized information from the polarization sensor 230, and estimates a three-dimensional shape of the real object based on the acquired polarized information and the orientation information of the predetermined viewing point. The information processing device 100 may also generate a model reproducing the three-dimensional shape of the real object based on the estimation result of the three-dimensional shape of the real object. Details about an operation of the information processing device 100 will be described later.

The configuration described above is merely an example, and the system configuration of the information processing system 1 according to the embodiment is not limited to the example illustrated in FIG. 1. For example, as described above, the depth sensor 210 and the polarization sensor 230 may be integrally configured to be part of a device that is configured to be movable. The depth sensor 210 and the polarization sensor 230, and the information processing device 100 may be integrally configured.

In the example illustrated in FIG. 1, the information processing device 100 acquires the orientation information of the predetermined viewing point (for example, the information acquisition device 200) based on the acquisition result of the depth information obtained by the depth sensor 210, but the configuration and the method thereof are not limited so long as the orientation information can be acquired. That is, as a configuration for acquiring the orientation information of the predetermined viewing point, another configuration may be disposed in place of the depth sensor 210. Alternatively, the polarization sensor 230 may function as an alternative to the depth sensor 210. For example, it is possible to generate an image imitating an optical image in the real space by compositing polarized images based on the respective pieces of polarized light the polarization direction of which are different from each other, and acquire the orientation information of the predetermined viewing point based on the generated image.

The example of the schematic system configuration of the information processing system 1 according to the embodiment has been described above with reference to FIG. 1.

2. EXAMINATION FOR ESTIMATION OF THREE-DIMENSIONAL SHAPE

Subsequently, the following explains an outline of an example of a technique related to estimation of the three-dimensional shape of the object in the real space, and organizes problems of the information processing system according to the embodiment.

Examples of the technique for estimating the three-dimensional shape of the object in the real space mainly include a technique utilizing an active-type sensor and a technique utilizing a passive-type sensor.

Specifically, as the technique related to estimation of the three-dimensional shape utilizing the active-type sensor, for example, "Structured Light", "Patterned Light", "Time Of Flight", "Iterative Closest Point (ICP)", and "Truncated Signed Distance Function (TSDF)" are exemplified. By way of more specific example, in depth estimation employing an active irradiation scheme, light is actively emitted to the object in the real space, and reflected light that is reflected by the object is detected to estimate the distance to the object.

In accordance with the characteristic as described above, in a case of utilizing the active-type sensor, accuracy in depth estimation is changed depending on irradiation power of light, and power consumption tends to be increased to implement more stable depth estimation. By way of specific example, in a case of stably estimating the distance to the object at a distance of about several meters, about several tens of watts of electric power is required in some cases. In a case of utilizing the active-type sensor, interference may be caused under a situation in which a plurality of devices are operating because each of the devices emits light. Additionally, in a case of utilizing the active-type sensor, due to the characteristic of a mechanism related to estimation of the distance to the object described above, brightness of external environment influences estimation of the depth with respect to the object in some cases. Specifically, in outdoor environment strongly influenced by sunlight, the reflected light from the object is difficult to be detected, so that the distance to the object is difficult to be estimated in some cases.

On the other hand, as the technique related to estimation of the three-dimensional shape utilizing the passive-type sensor, for example, exemplified is a method based on triangulation with multi-aspect observation utilizing a stereo camera and the like. In the method utilizing the passive-type sensor, light is not actively emitted to the object like the method utilizing the active-type sensor. For example, the distance to the object is estimated by extracting a feature point of the object from an image obtained by imaging the object as a subject.

In accordance with the characteristic as described above, in a case of utilizing the passive-type sensor, it may be difficult to stably estimate the distance to the object including few portions that can be extracted as feature points like a smoothly continuous surface in some cases. In a case of utilizing the passive-type sensor, influence of matching error, a quantization error related to depth estimation, and the like may become obvious in some cases.

In a case of utilizing any of the active-type sensor and the passive-type sensor, a data amount tends to be larger for representing the shape of the object in the real space more uniformly. As a method for estimating a surface shape of the object, a method of utilizing information about a normal line of the surface of the object can be exemplified, but calculation cost tends to be increased for processing related to estimation of the normal line utilizing the estimation result of the distance (that is, the depth) to the object. By utilizing the estimation result of the distance to the object, in a case of reproducing the shape of the object with a three-dimensional model, for example, a plurality of objects may be reproduced as a series of polygons in which respective surfaces of the objects are continuous, and it may be difficult to perform segmentation with a physical boundary in some cases. In the present description, the physical boundary corresponds to a boundary of a portion in which spaces are discontinuous, for example, indicates a boundary between objects in the real space, a boundary between a plurality of surfaces constituting the object, and the like.

Also exemplified is a method of estimating the shape of the object based on an optical image of the object taken by what is called a digital camera (for example, a stereo camera and the like), but also in such a case, it may be difficult to perform segmentation by recognizing the physical boundary in some cases. For example, FIG. 2 and FIG. 3 are explanatory diagrams for explaining an example of the method related to estimation of the shape of the object.

Figure 2:
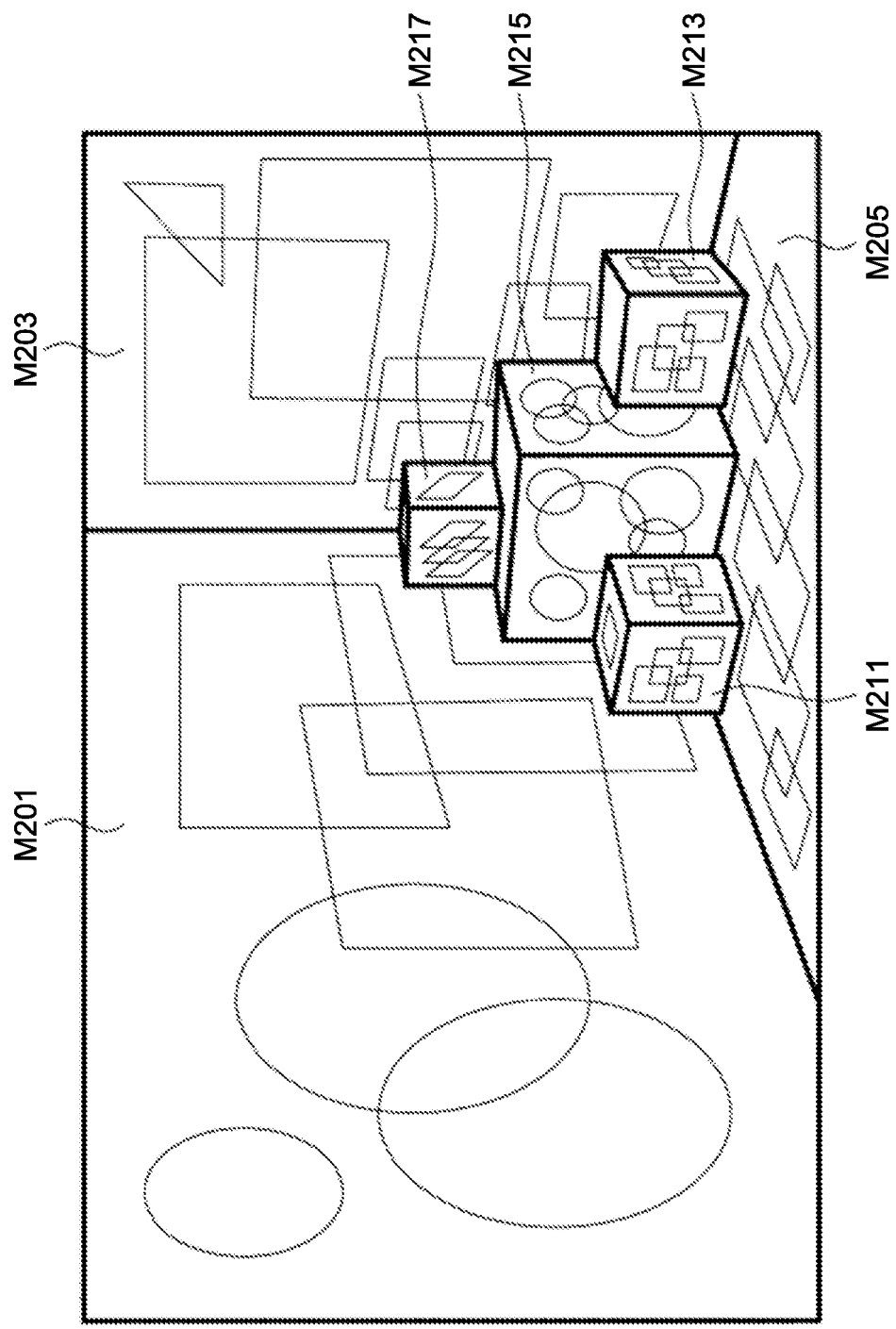
FIG. 2 is an explanatory diagram for explaining an example of a method related to estimation of a shape of an object.

Specifically, FIG. 2 schematically illustrates an environment in which the object is placed in the real space. In FIG. 2, the reference numerals M201 and M203 denote wall surfaces in the real space. The reference numeral M205 denotes a bottom surface in the real space. The reference numerals M211 to 217 denote objects (real objects) placed in a space surrounded by the wall surfaces M201 and M203. In the example illustrated in FIG. 2, a pattern or a design (in other words, a texture) is added to each surface of the wall surfaces M201 and M203, the bottom surface M205, and the objects M211 to M217. In the example illustrated in FIG. 2, for convenience, physical boundaries among the respective wall surfaces M201 and M203, the bottom surface M205, and respective surfaces of the objects M211 to M217 are indicated by a thick line, and patterns and designs added to the respective surfaces are indicated by a thin line.

Figure 3:
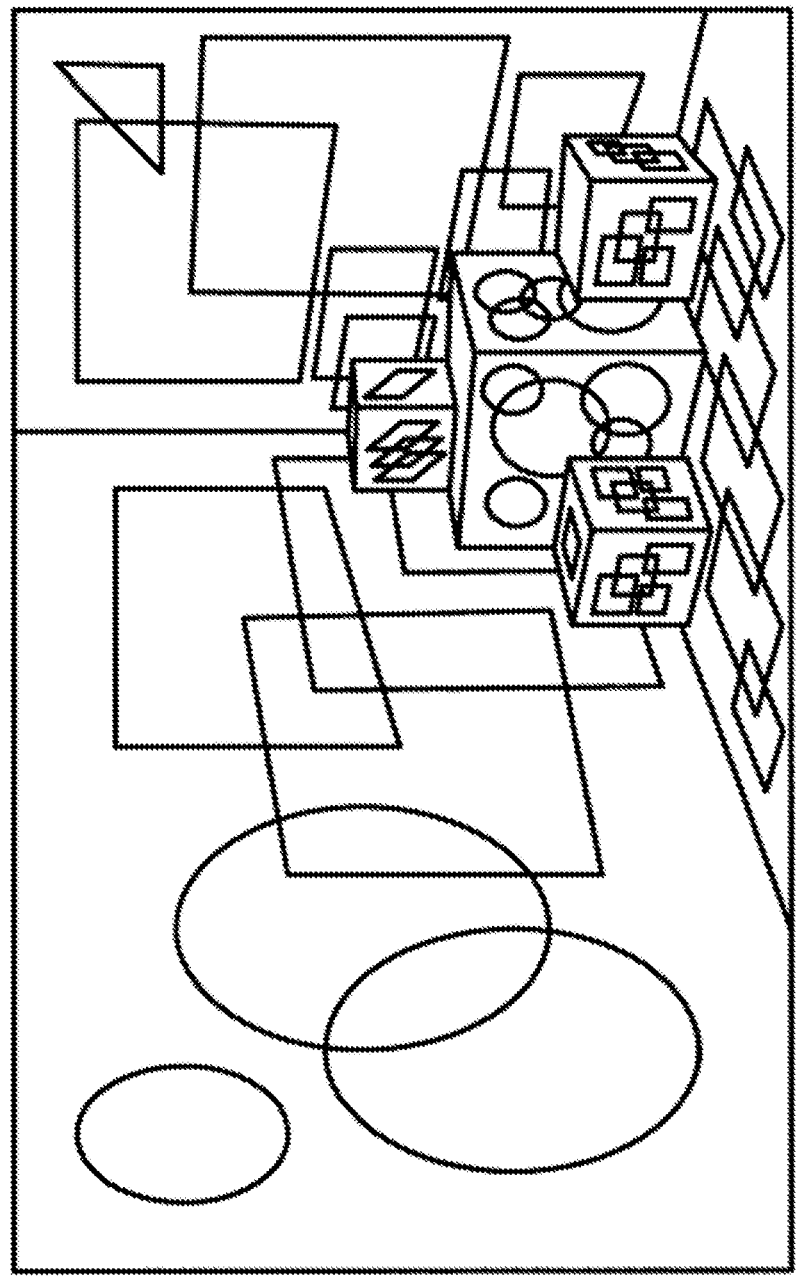
FIG. 3 is an explanatory diagram for explaining an example of a method related to estimation of a shape of an object.

FIG. 3 illustrates an example of a case in which an optical image of the environment illustrated in FIG. 2 is taken by a digital camera and the like, boundary detection is performed based on the imaging result, and segmentation is performed based on a result of the boundary detection. As illustrated in FIG. 3, in a case of performing boundary detection based on the optical image of the object, it is difficult to discriminate physical boundaries from lines of patterns and designs added to the respective surfaces. That is, in the example illustrated in FIG. 3, segmentation is difficult to be performed by discriminating the physical boundaries, and as a result, it may be difficult to estimate the shape of the object (for example, the wall surfaces M201 and M203, the bottom surface M205, and the objects M211 to M217) in some cases.

In view of such a situation as described above, the present disclosure provides a technique of enabling the three-dimensional shape of the object in the real space to be estimated in a more preferred manner, and enabling the three-dimensional shape to be modeled in a more preferred manner in accordance with the estimation result. Specifically, the present disclosure provides an example of a mechanism that can reduce a processing load and a data amount related to estimation of the three-dimensional shape of the object in the real space and improve accuracy related to estimation of the three-dimensional shape at the same time.

3. TECHNICAL FEATURE

The following describes a technical feature of the information processing system according to the embodiment.

3.1. Functional Configuration

Figure 4:
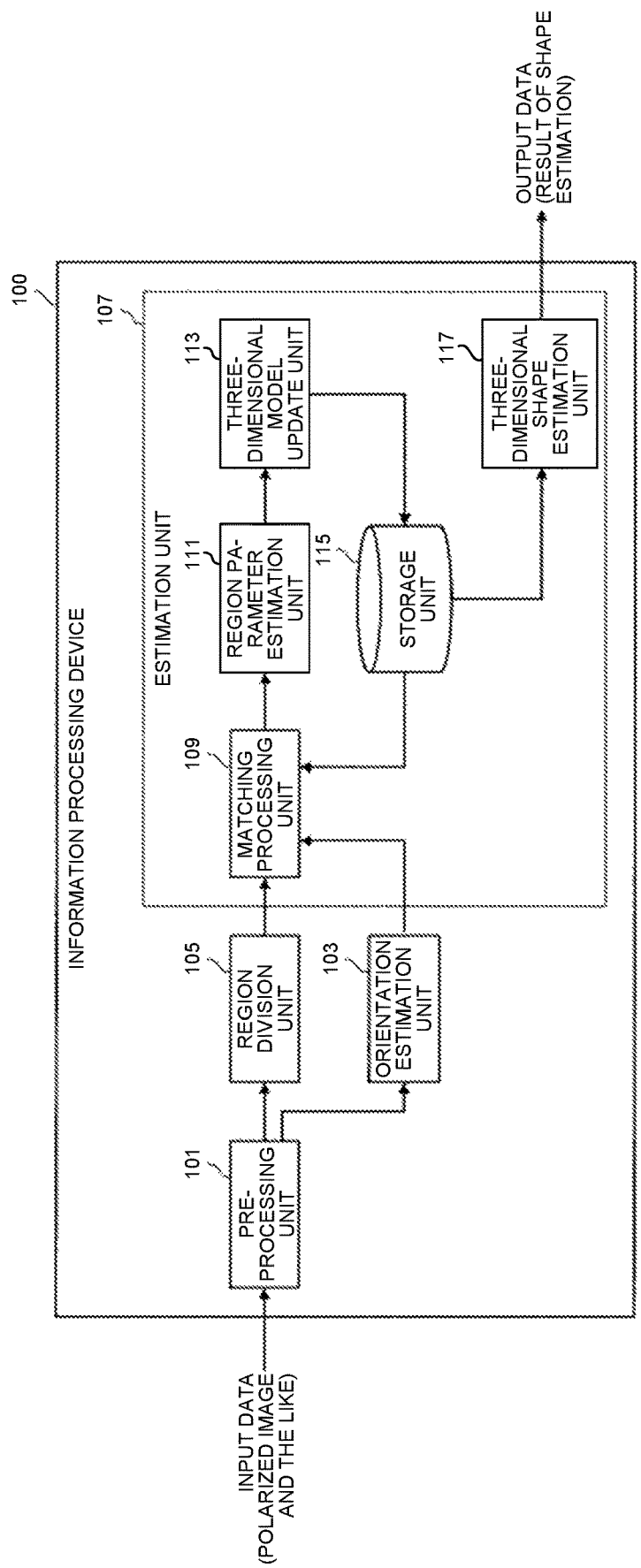
FIG. 4 is a block diagram illustrating an example of a functional configuration of an information processing device according to the embodiment.

First, with reference to FIG. 4, the following describes an example of a functional configuration of the information processing system according to the embodiment especially focusing on the configuration of the information processing device 100 illustrated in FIG. 1. FIG. 4 is a block diagram illustrating an example of the functional configuration of the information processing device according to the embodiment.

As illustrated in FIG. 4, the information processing device 100 according to the embodiment includes a preprocessing unit 101, an orientation estimation unit 103, a region division unit 105, and an estimation unit 107. The estimation unit 107 includes a matching processing unit 109, a region parameter estimation unit 111, a three-dimensional model update unit 113, a storage unit 115, and a three-dimensional shape estimation unit 117.

The preprocessing unit 101 acquires various kinds of information used for shape estimation of the object in the real space as input data. By way of specific example, the preprocessing unit 101 acquires, as input data, various kinds of information acquired by the information acquisition device 200 illustrated in FIG. 1, for example, a polarized image (polarized information) acquired by the polarization sensor 230, an image (for example, a stereo image) of the subject taken by the imaging units 210a and 210b, and the like. The preprocessing unit 101 performs predetermined preprocessing on the acquired input data, and outputs the preprocessed data to the orientation estimation unit 103 and the region division unit 105.

More specifically, the preprocessing unit 101 acquires, from the polarization sensor 230, polarized images taken by the polarization sensor 230 illustrated in FIG. 1 for each of a plurality of pieces of polarized light having different polarization directions (for example, N Raw images) as input data. The preprocessing unit 101 applies a predetermined filter such as a Gaussian filter or a bilateral filter to the acquired polarized image to remove noise in the polarized image. The preprocessing unit 101 may also perform geometric distortion correction based on calibration information that is acquired in advance for the acquired polarized image.

The preprocessing unit 101 may acquire, as input data, a stereo image taken by the imaging units 210a and 210b illustrated in FIG. 1. In this case, the preprocessing unit 101 may perform what is called paralleling processing on the input data.

The preprocessing unit 101 may also overlap polarized images respectively corresponding to the pieces of polarized light to generate an image including the optical image of the object imaged in the polarized image.

The preprocessing unit 101 also calculates information about a geometric structure (hereinafter, also referred to as "geometric structure information") of the object imaged in the polarized image by performing polarization imaging processing based on cosine curve fitting on light intensity represented by the polarized image (that is, corresponding to light intensity of the pieces of polarized light, and corresponding to the polarization information).

As the geometric structure information described above, for example, exemplified are information corresponding to an amplitude and a phase obtained as a result of the cosine curve fitting described above, and information about a normal line of the surface of the object (hereinafter, also referred to as "normal line information") that is calculated based on the amplitude and the phase. As the normal line information, exemplified are information representing a normal vector with a zenith angle and an azimuth angle, information representing the vector with a three-dimensional coordinate system, and the like. The zenith angle can be calculated from an amplitude of a cosine curve. The azimuth angle can be calculated from a phase of the cosine curve. Obviously, the zenith angle and the azimuth angle can be converted into a three-dimensional coordinate system represented by xyz and the like. Information indicating distribution of the normal line information obtained by mapping the normal line information described above on the image plane of the polarized image corresponds to what is called a normal map. Information before being subjected to the polarization imaging processing described above, that is, the polarized information may be used as the geometric structure information.

On the basis of the above description, the polarized image acquired by the polarization sensor 230 and the information obtained by mapping the geometric structure information that is calculated based on the polarization imaging processing on the image plane of the polarized image may be collectively referred to as a "polarized image" in some cases in the following description. That is, in a case of simply writing the "polarized image" in the following description, it may include any of the polarized image acquired by the polarization sensor 230 and the polarized image subjected to the preprocessing described above unless specifically noted.

The preprocessing unit 101 then outputs various kinds of information described above acquired by performing various kinds of processing (that is, preprocessing) on the input data to the orientation estimation unit 103 or the region division unit 105 at a latter stage.

The orientation estimation unit 103 estimates at least one of the position and the orientation of the predetermined viewing point in the real space. The predetermined viewing point indicates a target for estimating the position and the orientation in the real space, and may correspond to the polarization sensor 230, the imaging units 210a and 210b, and the information acquisition device 200 holding the polarization sensor 230 and the imaging units 210a and 210b illustrated in FIG. 1, for example. In the following description, it is assumed that the orientation estimation unit 103 estimates the position and the orientation of the information acquisition device 200 in the real space.

By way of specific example, the orientation estimation unit 103 acquires an image obtained by imaging the object in the real space from the preprocessing unit 101 as input information. As the input information, for example, exemplified are an image generated by overlapping polarized images respectively corresponding to a plurality of pieces of polarized light, a stereo image taken by the imaging units 210a and 210b, and the like. The orientation estimation unit 103 estimates, based on the acquired input information, the position and the orientation of the information acquisition device 200 in the real space by utilizing a technique of self-position estimation based on image information such as the SLAM or Structure from Motion (SfM).

A configuration and a method for the estimation are not limited so long as the position and the orientation of the information acquisition device 200 in the real space can be estimated. By way of specific example, the position and the orientation of the information acquisition device 200 in the real space may be estimated by utilizing a technique such as Iterative Closest Point (ICP) based on the depth information acquired by the depth sensor. In accordance with the configuration for estimation described above, a type of at least part of the data that is acquired by the preprocessing unit 101 as the input data and content of processing that is performed on the at least part of the data by the preprocessing unit 101 may be appropriately changed. The configuration for acquiring the at least part of the data (for example, a configuration held by the information acquisition device 200) may also be appropriately changed.

The orientation estimation unit 103 then outputs, to the estimation unit 107 (matching processing unit 109), information indicating an estimation result of at least one of the position and the orientation of the information acquisition device 200 in the real space. In the following description, in a case of indicating at least one of the position and the orientation of an object as a target such as the information acquisition device 200 in the real space, it may also be simply referred to as the "orientation of the object" (for example, the orientation of the information acquisition device 200). Information indicating an estimation result of the orientation of the object as a target may also be referred to as "orientation information". A configuration of acquiring the orientation information such as the orientation estimation unit 103 corresponds to an example of an "acquisition unit".

The region division unit 105 acquires various kinds of information including the polarized image from the preprocessing unit 101. The region division unit 105 receives the geometric structure information in the acquired polarized image as an input and detects physical boundaries by determining spatial continuity in the polarized image to divide the image plane of the polarized image into a plurality of regions. As a method for detecting the physical boundaries, for example, a Connected-Component-labeling method, a Mean-Shift method, a method using Random sample consensus (RANSAC), a Graph-Cuts method, and the like can be utilized.

Figure 5:
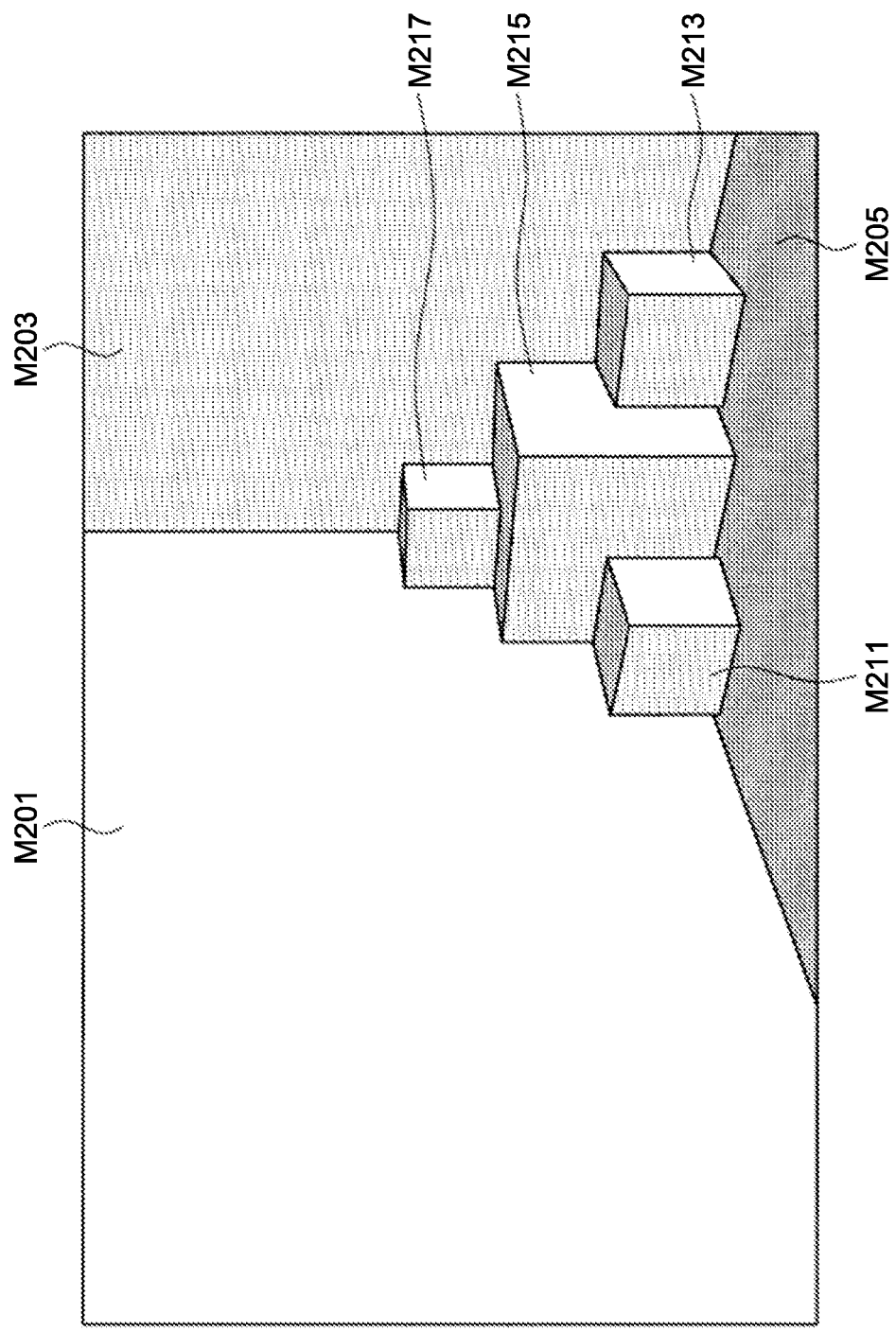
FIG. 5 is an explanatory diagram for explaining an example of a polarized image.

As information for identifying respective regions obtained by dividing the image plane of the polarized image, the region division unit 105 may label each of the regions. For example, FIG. 5 is an explanatory diagram for explaining an example of the polarized image, and schematically illustrates an example of the polarized image obtained by imaging the environment illustrated in FIG. 2. In FIG. 5, each of the reference numerals M201 to M217 indicates a target denoted by the same reference numeral in FIG. 2. As is clear from comparison between FIG. 5 and FIGS. 2 and 3, by utilizing the polarized image, it is possible to detect the physical boundaries such as a boundary between the objects in the real space and a boundary between a plurality of surfaces constituting the object irrespective of whether a pattern or a design is added to the surface of the object.

Figure 6:
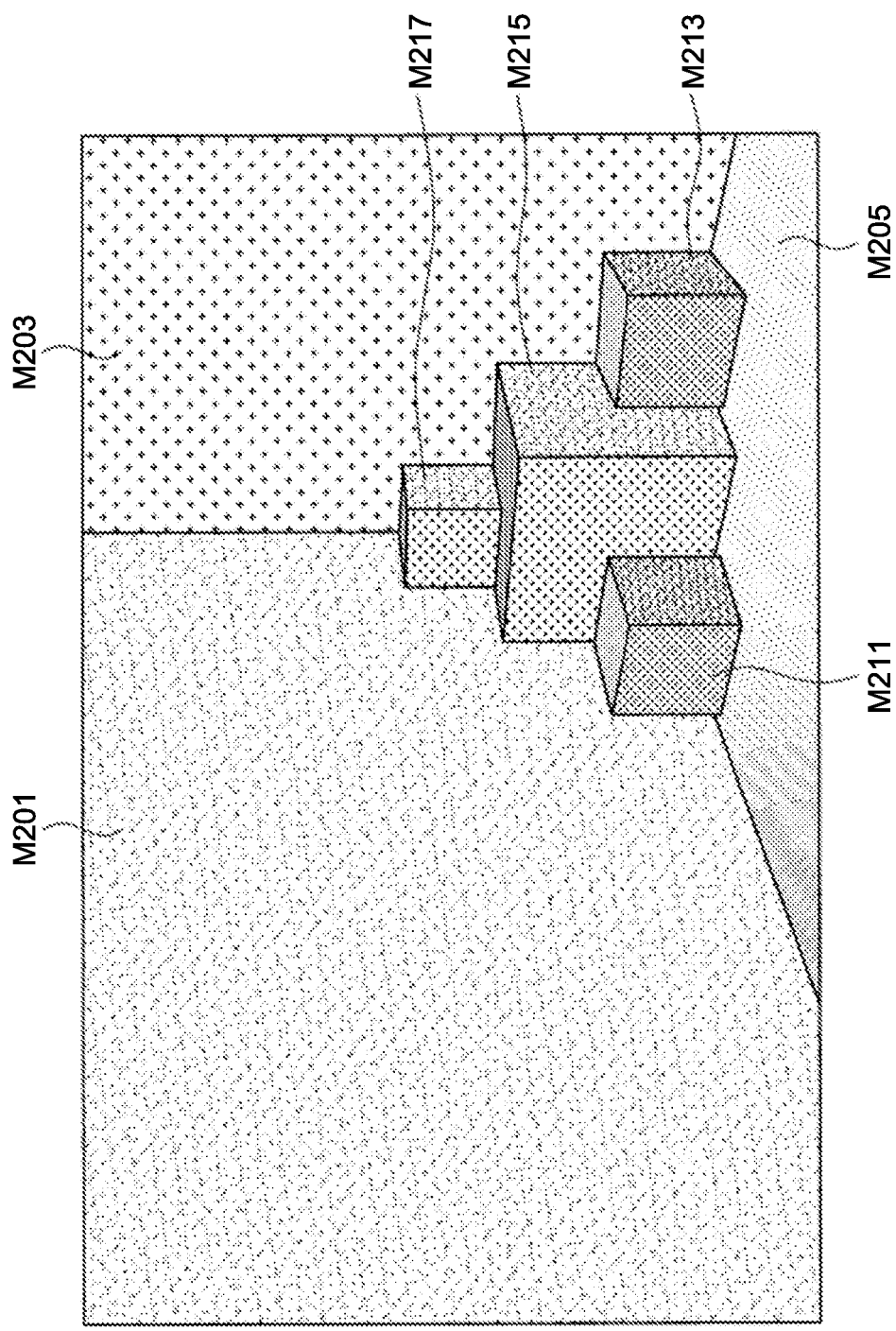
FIG. 6 is an explanatory diagram for explaining processing related to region division of an image plane of the polarized image performed by the information processing device according to the embodiment.

FIG. 6 is an explanatory diagram for explaining processing related to region division of the image plane of the polarized image performed by the information processing device according to the embodiment, and illustrates an example of a result obtained by dividing the polarized image illustrated in FIG. 5 into a plurality of regions based on the detection result of the boundaries of the objects.

The region division unit 105 then labels each of the regions so as to be able to identify each of the regions obtained by dividing the image plane of the polarized image.

In a case in which the surface of the object includes a curved surface, the curved surface includes portions indicating different values of geometric structure information (that is, having different normal directions), but the portions have spatial continuity (that is, the portions are configured as a continuous plane). Specifically, in a case in which there is no spatial continuity like a plurality of surfaces adjacent to each other, the geometric structure information is largely changed at a spatially discontinuous portion such as a boundary between the surfaces. On the other hand, in a case in which there is spatial continuity like a curved surface, the geometric structure information is continuously changed in a region corresponding to the curved surface. That is, in a case in which there is spatial continuity, a change in the geometric structure information is smaller than that in the spatially discontinuous portion between pixels close to each other (for example, adjacent pixels) in the polarized image. By utilizing such a characteristic, for example, the region division unit 105 may approximate, as regions on the same surface, portions in which a change in the geometric structure information is equal to or smaller than a threshold between the adjacent pixels, and may label the portions.

Figure 7:
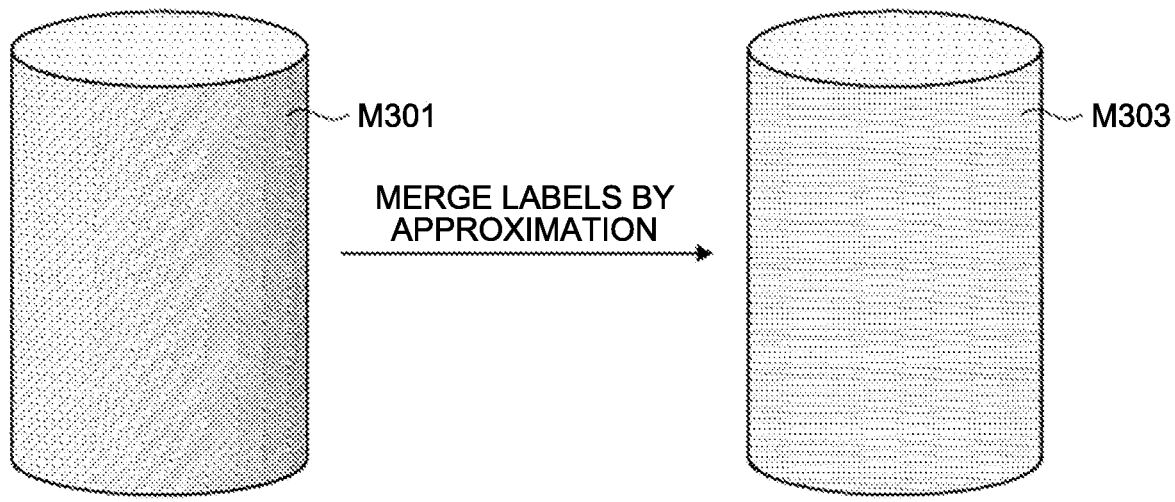
FIG. 7 is an explanatory diagram for explaining processing related to region division of the image plane of the polarized image performed by the information processing device according to the embodiment.

For example, FIG. 7 is an explanatory diagram for explaining processing related to region division of the image plane of the polarized image performed by the information processing device according to the embodiment, and is an explanatory diagram for explaining the approximation processing described above. Specifically, a side surface M301 of a cylindrical object illustrated in the left diagram of FIG. 7 is formed as a curved surface, so that a normal direction thereof is different depending on a position in a circumferential direction. On the other hand, a change in the normal direction is small between portions close to each other along the circumferential direction of the side surface M301. That is, in a region corresponding to the side surface M301 in the polarized image, a change in geometric image information is small between adjacent pixels. Thus, labeling can be performed to be able to recognize, as one surface, the side surface M301 formed as a curved surface through the approximation processing described above. For example, the right diagram of FIG. 7 illustrates an example of a result of the labeling, and the labeling is performed to be able to recognize, as one surface, a region M303 corresponding to the side surface M301 in the left diagram.

By way of specific example, in the example illustrated in FIG. 6, regions having different values of geometric structure information are present in part of the bottom surface M205. Also in such a case, the bottom surface M205 having spatial continuity can be recognized as one surface based on the processing described above. That is, through the processing described above, not only a plane but also one surface having spatial continuity such as a curved surface can be divided from the image plane of the polarized image as one region.

Figure 8:
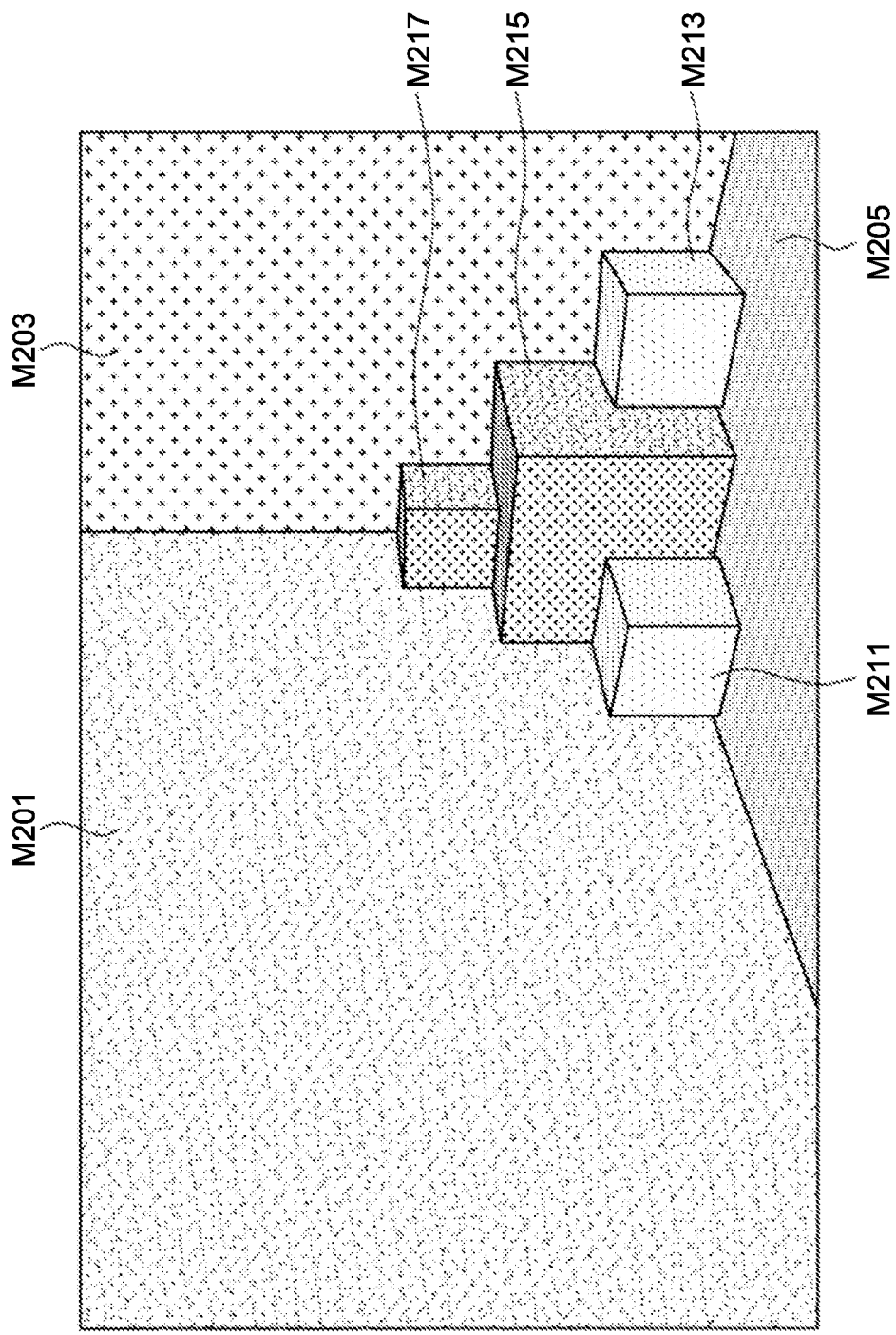
FIG. 8 is an explanatory diagram for explaining processing related to region division of the image plane of the polarized image performed by the information processing device according to the embodiment.

For example, FIG. 8 is an explanatory diagram for explaining processing related to region division of the image plane of the polarized image performed by the information processing device according to the embodiment, and illustrates an example of a result obtained by performing labeling on the result of region division illustrated in FIG. 6. That is, through the processing described above, as illustrated in FIG. 8, it becomes possible to identify each of a plurality of regions obtained by dividing, with physical boundaries, the image plane of the polarized image in which the environment illustrated in FIG. 2 is imaged. It can be found that, in the example illustrated in FIG. 8, it is possible to identify, as one surface having spatial continuity, the bottom surface M205 including regions having different values of geometric structure information in FIG. 6.

The region division unit 105 then outputs, to the estimation unit 107 (matching processing unit 109), information indicating the result of region division described above based on the acquired polarized image.

Subsequently, the following describes an operation of the estimation unit 107. The estimation unit 107 successively acquires the result of region division obtained by the region division unit 105 and the result of estimation obtained by the orientation estimation unit 103. The estimation unit 107 successively updates the three-dimensional model obtained by modeling the object in the real space based on the acquired information described above, and estimates the shape of the object based on the three-dimensional model. The data of the three-dimensional model is, for example, stored in the storage unit 115. The storage unit 115 is a storage region for temporarily or constantly storing various kinds of data. The following describes the operation of the estimation unit 107 in more detail.

The matching processing unit 109 successively acquires, from the region division unit 105, information about the regions obtained by dividing the image plane of the acquired polarized image. The matching processing unit 109 also successively acquires, from the orientation estimation unit 103, orientation information of the predetermined viewing point (for example, the information acquisition device 200). The matching processing unit 109 then estimates a positional relation in the real space between the viewing point and the object imaged in the polarized image based on the respective pieces of information acquired from the region division unit 105 and the orientation estimation unit 103.

The matching processing unit 109 causes each surface region of the three-dimensional model (for example, a region corresponding to each surface of the object) to be projected on the orientation of the viewing point in accordance with the positional relation between the estimation result of the orientation of the viewing point and the three-dimensional model that was estimated in the past and stored in the storage unit 115 (that is, the three-dimensional model of the object imaged in the polarized image). As described above, the matching processing unit 109 performs matching between each region divided from the image plane of the polarized image and each surface region of the three-dimensional model. At this point, based on the matching (in other words, considering the three-dimensional model that was estimated in the past), the matching processing unit 109 may finely divide or expand a known region for which the three-dimensional model was estimated in the past.

The matching processing unit 109 successively extracts, as a region of interest, any of the regions divided from the image plane of the polarized image. The matching processing unit 109 then successively outputs, to the region parameter estimation unit 111, information about the extracted region of interest, information indicating a matching result between the region of interest and each surface region of the three-dimensional model, and information indicating the estimation result of the orientation of the viewing point (that is, the orientation information of the information acquisition device 200). A portion that extracts the region of interest described above in the matching processing unit 109 (by extension, the estimation unit 107) corresponds to an example of an "extracting unit".

The region parameter estimation unit 111 acquires, from the matching processing unit 109, the information about the region of interest, the information indicating a matching result between the region of interest and each surface region of the three-dimensional model, and the orientation information of the information acquisition device 200 in an observation frame.

The region parameter estimation unit 111 estimates region parameters of a surface in the real space corresponding to the region of interest (hereinafter, also simply referred to as a "surface corresponding to the region of interest") based on the geometric structure information (for example, normal line information) of the region of interest. The region parameters of the surface corresponding to the region of interest are represented by the following (expression 1).

$$qx^T = q_x x + q_y y + q_z z = 1 \qquad \text{(expression 1)}$$

Only with the information based on the polarized image viewed from one viewing point, a normal line of a surface corresponding to the region of interest can be specified, but a distance between the viewing point and the surface (that is, a distance in a depth direction, in other words, a depth) becomes an unknown value. Thus, the information processing device 100 according to the embodiment also utilizes information from another viewing point different from the above viewing point, and solves a non-linear optimization problem of 3 degrees of freedom constituted of the depth and the normal line of the surface corresponding to the region of interest to estimate the position of the surface corresponding to the region of interest in the real space. In the following description, among frames corresponding to the respective viewing points described above, a frame as a reference is referred to as a "reference frame", and a frame other than the reference frame is referred to as an "observation frame".

Specifically, the region parameter estimation unit 111 projects the surface (in other words, the region of interest corresponding to the reference frame) on the image plane corresponding to the observation frame in accordance with the orientation of the viewing point corresponding to the reference frame (orientation of the information acquisition device 200) and the region parameters of the surface corresponding to the region of interest. In this case, the image plane corresponding to the observation frame corresponds to the image plane of the polarized image taken from the viewing point corresponding to the observation frame, or the image plane of the polarized image that may be taken from the viewing point. The same applies to the image plane corresponding to the reference frame.

Figure 9:
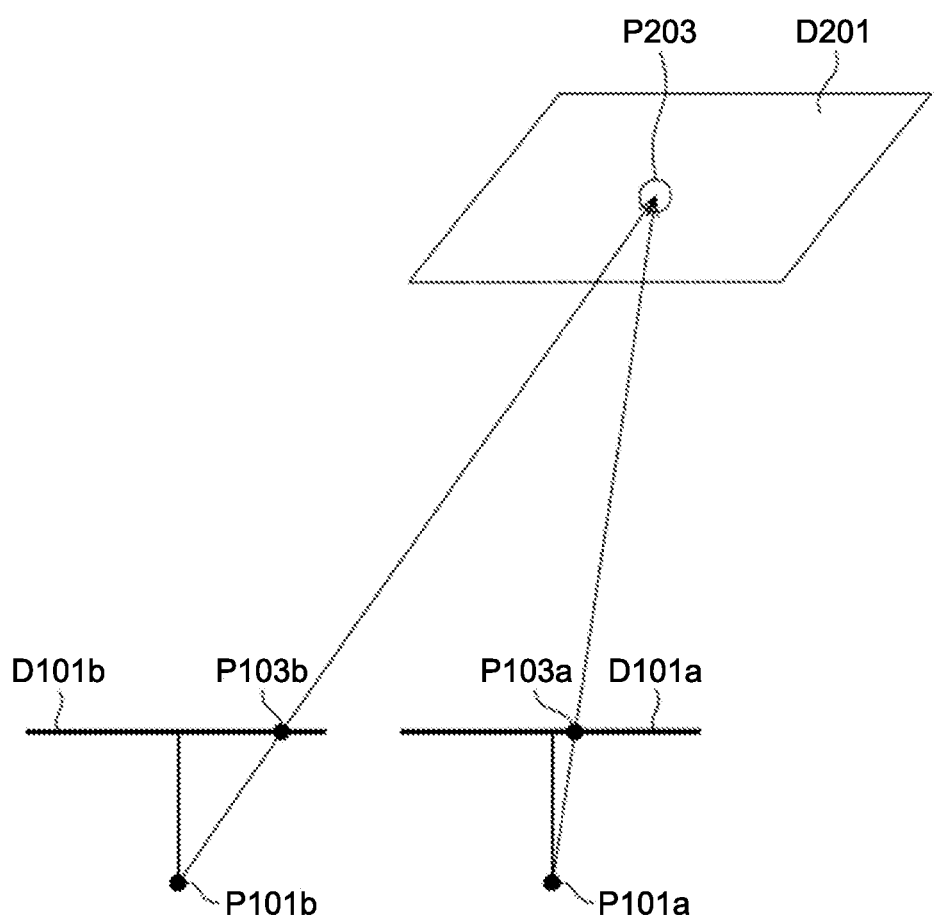
FIG. 9 is an explanatory diagram for explaining processing related to estimation of the shape of the object performed by the information processing device according to the embodiment.

For example, FIG. 9 is an explanatory diagram for explaining processing related to estimation of the shape of the object performed by the information processing device according to the embodiment, and illustrates a relation between the orientation of the viewing point corresponding to each of the reference frame and the observation frame, and a surface corresponding to the region of interest. In FIG. 9, the reference numeral D201 schematically denotes a surface corresponding to the region of interest. The reference numeral D203 schematically denotes a position to be noted (hereinafter, also referred to as a "position of interest") in the surface corresponding to the region of interest. The reference numeral P101a denotes the viewing point corresponding to the reference frame. The reference numeral D101a schematically denotes an image plane corresponding to the reference frame. The reference numeral P103a schematically denotes a pixel on the image plane D101a corresponding to a position of interest P203. That is, the pixel P103a corresponds to a pixel in the region of interest (that is, a region corresponding to the surface D201) on the image plane D101a. The reference numeral P101b denotes the orientation of the viewing point corresponding to the observation frame. The reference numeral D101b schematically denotes an image plane corresponding to the observation frame. The reference numeral P103b schematically denotes a pixel on the image plane D101b corresponding to the position of interest P203. That is, the pixel P103b corresponds to a pixel in the region of interest on the image plane D101b.

Figure 10:
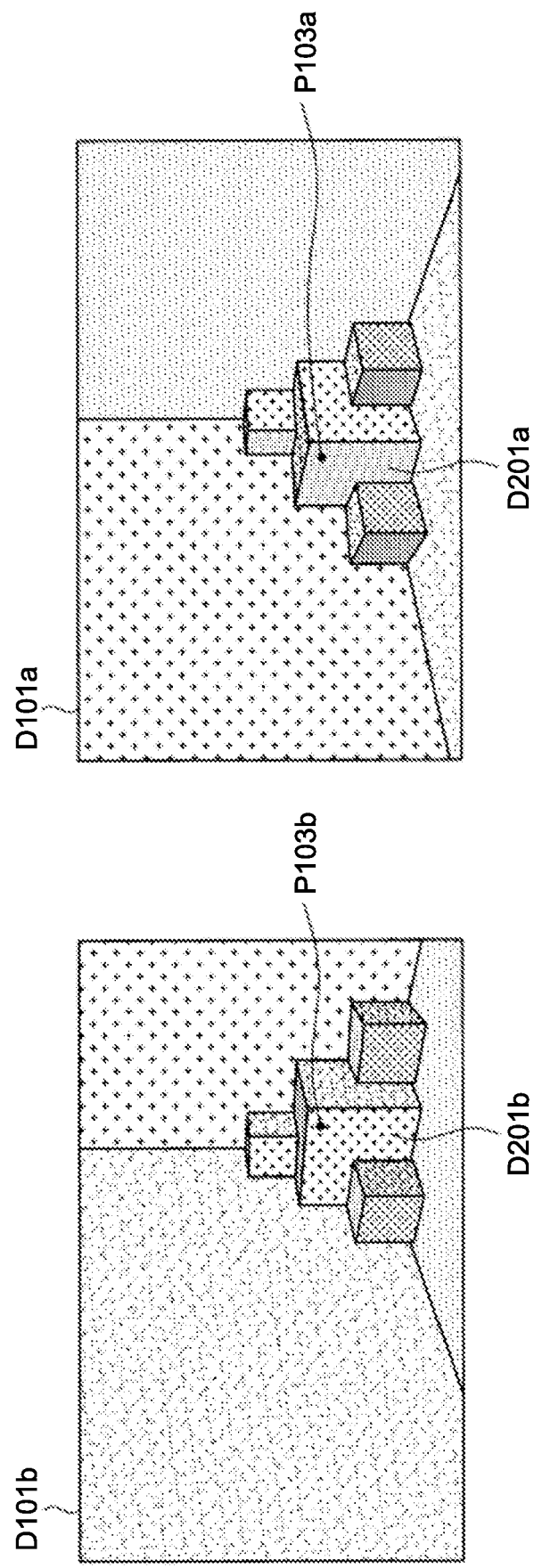
FIG. 10 is an explanatory diagram for explaining processing related to estimation of the shape of the object performed by the information processing device according to the embodiment.

FIG. 10 is an explanatory diagram for explaining processing related to estimation of the shape of the object performed by the information processing device according to the embodiment, and schematically illustrates respective regions obtained by dividing the image plane corresponding to each of the reference frame and the observation frame. In FIG. 10, the reference numerals D101a and D101b denote an example of the image planes D101a and D101b illustrated in FIG. 9. In FIG. 10, the reference numeral D201a schematically denotes the region of interest on the image plane D101a. Similarly, the reference numeral D201b schematically denotes the region of interest on the image plane D101b. That is, each of the regions of interest D201a and D201b indicates the same plane in the real space. The reference numeral P103a denotes the pixel P103a on the image plane D101a illustrated in FIG. 9. Similarly, the reference numeral P103b denotes the pixel P103b on the image plane D101b illustrated in FIG. 9.

It is assumed that the following (expression 2) represents a position $u_0$ (hereinafter, also referred to as a "pixel position") on the image plane D101a of the pixel P103a corresponding to the position of interest P203 (that is, a pixel in the region of interest D201a) on the image plane D101a corresponding to the reference frame.

$$u_0 = \begin{pmatrix} x \\ y \\ z \end{pmatrix} = \begin{pmatrix} x_0 \\ y_0 \\ 1 \end{pmatrix} \quad \text{(expression 2)}$$

It is assumed that a normal vector of the surface D201 in the image plane D101b corresponding to the observation frame (that is, a normal vector of the region of interest D201b illustrated in FIG. 10) is denoted by $\bar{q}$. In the present description, "$\bar{q}$" is assumed to indicate a character obtained by adding a bar above "q". In the following description, the normal vector $\bar{q}$ is also referred to as an "initial value of a plane normal vector".

A method of acquiring the initial value $\bar{q}$ of the plane normal vector is not limited. For example, information about the normal line of the region of interest may be acquired from distribution of the geometric structure information (for example, a normal map) based on the polarized image, and a fixed value set by a user may be utilized as a distance between the region of interest and the viewing point to acquire the initial value $\bar{q}$ of the plane normal vector. By way of another example, a relative orientation of the viewing point (orientation of the information acquisition device 200) with respect to the plane corresponding to the region of interest is assumed to be fixed, and a fixed normal line and distance may be utilized. By way of yet another example, in a case in which a change in the orientation of the viewing point can be detected by an acceleration sensor and the like, the plane corresponding to the region of interest is assumed to be oriented in a specific direction (for example, the region of interest is assumed to be the ground or a wall surface), and a fixed distance and a normal line of the plane that is calculated based on a vector in a gravity direction and the orientation of the viewing point may be utilized. In a case of being able to utilize the three-dimensional model of the region of interest based on observation and estimation in the past, the normal line and the distance can be obtained by projecting the region of interest on the image plane of the polarized image on the three-dimensional model utilizing the orientation of the viewing point.

Based on the above description, the pixel position on the image plane D101b of the pixel P101b corresponding to the observation frame is, for example, represented as $W_Q(u_0, \bar{q})$ based on the pixel position $u_0$ of the pixel P101a corresponding to the reference frame and the initial value $\bar{q}$ of the plane normal vector. Herein, $W_Q$ is a function representing projection.

The region parameter estimation unit 111 successively changes the pixel P103a corresponding to the position of interest P203 in the region of interest D201a corresponding to the reference frame, and calculates a sum of differences of pixel values (that is, geometric structure information) between the pixel P103a and the corresponding pixel P103b on the observation frame side. By solving a minimization problem using the sum of differences of pixel values of the pixels corresponding to the position of interest P203 between the reference frame and the observation frame (that is, the sum of differences of pixel values between the pixels P103a and P103b) as cost, the region parameter estimation unit 111 estimates the position and the orientation of the surface corresponding to the region of interest in the real space (specifically, the depth of the surface).

In this case, a correction amount of the plane normal vector is assumed to be $\Delta q$ with respect to the initial value $\bar{q}$ of the plane normal vector. That is, the correction amount $\Delta q$ corresponds to a change amount between the normal vector q of the surface corresponding to the region of interest and the initial value $\bar{q}$ of the plane normal vector. In this case, the cost described above is, for example, calculated by using the following computational expression represented as an (expression 3).

$$e(\bar{q} + \Delta q) = \sum_{i=1} \{I_R[u_{0i}] - I_Q[w_Q(u_{0i}, \bar{q} + \Delta q)]\}^2 \quad \text{(expression 3)}$$

In the (expression 3) described above, $e(\bar{q}+\Delta q)$ represented as the left side thereof corresponds to the cost described above. $u_{0i}$ represents a pixel position of the i-th pixel in the region of interest D201a on the image plane D101a corresponding to the reference frame. $I_R[u_{0i}]$ represents the pixel value of the pixel P103a at the pixel position $u_{0i}$ on the image plane D101a corresponding to the reference frame. Similarly, $I_Q[w_Q(u_{Oi}, q^- + \Delta q)]$ represents the pixel value of the pixel P103b at the pixel position $w_Q(u_{Oi}, q^- + \Delta q)$ on the image plane D101b corresponding to the observation frame. As described above, the pixel position $w_Q(u_{Oi}, q^- + \Delta q)$ represents the pixel position of the pixel P103b obtained by projecting the pixel P103a in the image plane D101a corresponding to the reference frame on the image plane D101b corresponding to the observation frame. The pixel P103a in the image plane D101a corresponding to the reference frame corresponds to an example of a "first pixel", and the pixel P103b obtained by projecting the pixel P103a on the image plane D101b corresponding to the observation frame corresponds to an example of a "second pixel".

As described above, the region parameter estimation unit 111 repeatedly calculates the cost described above while changing a condition of the initial value $q^-$ of the plane normal vector, and searches for a condition for reducing the cost. Based on the calculation described above, the correction amount $\Delta q$ for the initial value $q^-$ of the plane normal vector is obtained. Due to this, the region parameter estimation unit 111 is enabled to estimate the position and the orientation of the surface corresponding to the region of interest in the real space (in other words, the region parameters of the surface represented by the (expression 1) described above).

The region parameter estimation unit 111 then outputs, to the three-dimensional model update unit 113, information indicating the estimation result of the position and the orientation of the surface corresponding to the region of interest in the real space, and information indicating the matching result between the region of interest and the surface region of the three-dimensional model.

The three-dimensional model update unit 113 acquires, from the region parameter estimation unit 111, the information indicating the estimation result of the position and the orientation of the surface corresponding to the region of interest in the real space, and the information indicating the matching result between the region of interest and the surface region of the three-dimensional model. Based on the acquired information, the three-dimensional model update unit 113 corrects the position and the orientation of a corresponding surface region of the three-dimensional model the data of which is held by the storage unit 115 based on the information indicating the estimation result described above to update the three-dimensional model.

There may be a case in which the position and the orientation of the surface corresponding to the region of interest of the surface region of the three-dimensional model were not estimated in the past (that is, modeling has not been performed). In such a case, the matching processing unit 109 does not necessarily notify the three-dimensional model update unit 113 of the information indicating the matching result described above via the region parameter estimation unit 111. In this case, the three-dimensional model update unit 113 may additionally form a surface region obtained by modeling the surface corresponding to a target region on the three-dimensional model based on the information indicating the estimation result.

As described above, the position and the orientation of the surface in the real space corresponding to the region are estimated for each region divided from the image plane of the polarized image, and the three-dimensional model the data of which is held by the storage unit 115 is updated based on the estimation result. Also in a case in which the orientation of the viewing point (orientation of the information acquisition device 200) is changed, when the series of processing described above is performed in accordance with the estimation result of the orientation and the polarized image acquired at the viewing point, the three-dimensional model is updated.

The three-dimensional shape estimation unit 117 estimates the shape (for example, a surface shape) of the object in the real space based on the three-dimensional model the data of which is held by the storage unit 115. The three-dimensional shape estimation unit 117 may also generate data imitating the shape of the object in the real space based on the three-dimensional model. By way of specific example, the three-dimensional shape estimation unit 117 may generate a polygon mesh reproducing the three-dimensional shape of the object in the real space as a set of apexes, sides, and surfaces based on the three-dimensional model. The three-dimensional shape estimation unit 117 then outputs, as output data, the information indicating the estimation result of the shape of the object described above, and the data imitating the shape of the object described above to a predetermined output destination.

The functional configuration of the information processing device 100 illustrated in FIG. 4 is merely an example, and is not limited to the example illustrated in FIG. 4. By way of specific example, among the configurations of the information processing device 100 illustrated in FIG. 4, some configurations may be disposed in a device different from the information processing device 100 (for example, an external server and the like). The functions of the information processing device 100 described above may also be implemented by a plurality of devices cooperating with each other. Alternatively, the information processing device 100 and the information acquisition device 200 may be integrally configured.

With reference to FIG. 4 to FIG. 10, an example of the functional configuration of the information processing system according to the embodiment has been described above especially focusing on the configuration of the information processing device 100 illustrated in FIG. 1.

3.2. Processing

Subsequently, the following describes an example of a procedure of the series of processing performed by the information processing system according to the embodiment especially focusing on processing performed by the information processing device 100 illustrated in FIG. 1. For example, FIG. 11 is a flowchart illustrating an example of the procedure of the series of processing performed by the information processing device according to the embodiment.

Figure 11:
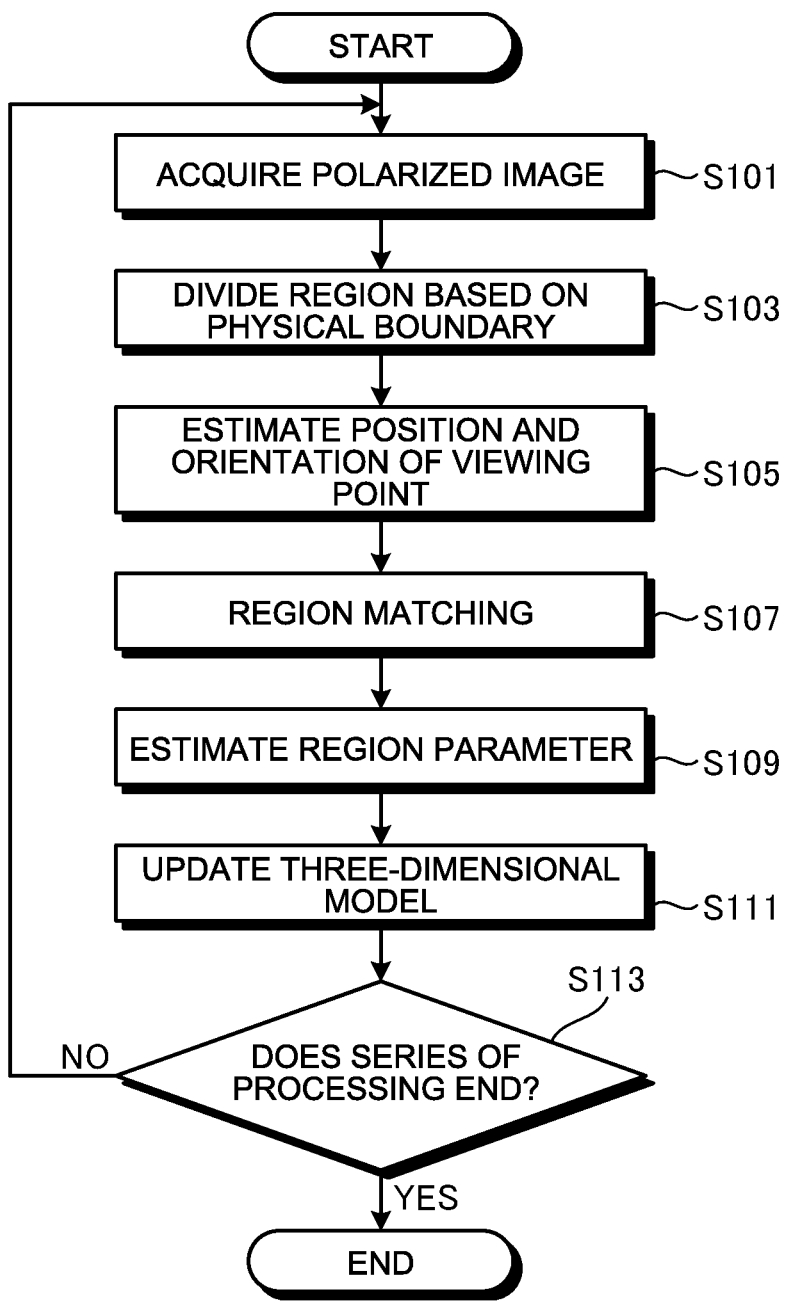
FIG. 11 is a flowchart illustrating an example of a procedure of a series of processing performed by the information processing device according to the embodiment.

As illustrated in FIG. 11, the information processing device 100 (preprocessing unit 101) acquires, from the information acquisition device 200, the input data including the polarized image (polarized information) acquired by the polarization sensor 230, the image (for example, a stereo image) of the subject taken by the imaging units 210a and 210b, and the like. The information processing device 100 may perform predetermined preprocessing on various kinds of information acquired as the input data. Content of the preprocessing has been described above, so that detailed description thereof will not be repeated (S101).

The information processing device 100 (region division unit 105) detects physical boundaries by determining spatial continuity in the acquired polarized image to divide the image plane of the polarized image into a plurality of regions. The information processing device 100 also performs labeling on each of the regions so that each of the regions obtained by dividing the imaging plane of the polarized image can be identified. At this point, the information processing device 100 may perform the labeling after approximating, as regions on the same surface, portions in which a change in the geometric structure information is equal to or smaller than a threshold between adjacent pixels (S103).

The information processing device 100 (orientation estimation unit 103) also estimates the orientation of the predetermined viewing point. A method of estimation is not limited. For example, the information processing device 100 may estimate the distance between the subject and the predetermined viewing point by utilizing parallax between stereo images of the subject taken by the imaging units 210a and 210b to estimate the orientation of the viewing point (S105).

The information processing device 100 (matching processing unit 109) performs matching between each of the regions obtained by dividing the image plane of the polarized image and each surface region of the three-dimensional model in accordance with a positional relation between the estimation result of the orientation of the viewing point and the three-dimensional model that was estimated in the past (S107).

The information processing device 100 (matching processing unit 109) extracts any of the regions divided from the image plane of the polarized image as the region of interest. The information processing device 100 (region parameter estimation unit 111) estimates region parameters of the surface corresponding to the region of interest based on the geometric structure information of the region of interest. The information processing device 100 projects the surface on the image plane corresponding to the observation frame in accordance with the orientation of the viewing point corresponding to the reference frame and the region parameters of the surface corresponding to the region of interest. The information processing device 100 successively changes a pixel corresponding to the position of interest in the region of interest corresponding to the reference frame, and calculates the sum of differences of pixel values (that is, the geometric structure information) between the pixel and a pixel on the observation frame side on which the former pixel is projected. By solving a minimization problem using, as the cost, the sum of differences of pixel values of the pixel corresponding to the position of interest between the reference frame and the observation frame, the information processing device 100 estimates the position and the orientation of the surface corresponding to the region of interest in the real space. The processing related to the estimation has been described above, so that detailed description thereof will not be repeated (S109).

The information processing device 100 (three-dimensional model update unit 113) updates the three-dimensional model by correcting the position and the orientation of a corresponding surface region of the three-dimensional model estimated in the past based on the estimation result of the position and the orientation of the surface corresponding to the region of interest in the real space (S111).

The pieces of processing denoted by the reference numerals S109 and S111 may be performed on two or more regions among the regions divided from the image plane of the polarized image using the two or more regions as regions of interest.

Through the processing as described above, for example, the information processing device 100 can estimate the shape (for example, a surface shape) of the object in the real space based on the three-dimensional model described above that is successively updated. By way of another example, the information processing device 100 can also generate data imitating the shape of the object in the real space (for example, a polygon mesh and the like) based on the three-dimensional model.

The information processing device 100 performs the series of processing denoted by the reference numerals S101 to S111 until the series of processing is instructed to be ended (No at S113). If the series of processing is instructed to be ended (Yes at S113), the information processing device 100 ends the processing described above.

With reference to FIG. 11, an example of the procedure of the series of processing performed by the information processing system according to the embodiment has been described above especially focusing on the processing performed by the information processing device 100 illustrated in FIG. 1.

3.3. Modification

Subsequently, the following describes a modification of the information processing system according to the embodiment. In the modification, described is an example of a case in which a plurality of observation frames are utilized. For example, FIG. 12 is an explanatory diagram for explaining processing related to estimation of the shape of the object performed by the information processing device according to the modification, and illustrates a relation between the orientation of the viewing point corresponding to each of the reference frame and the observation frame and the surface corresponding to the region of interest.

Figure 12:
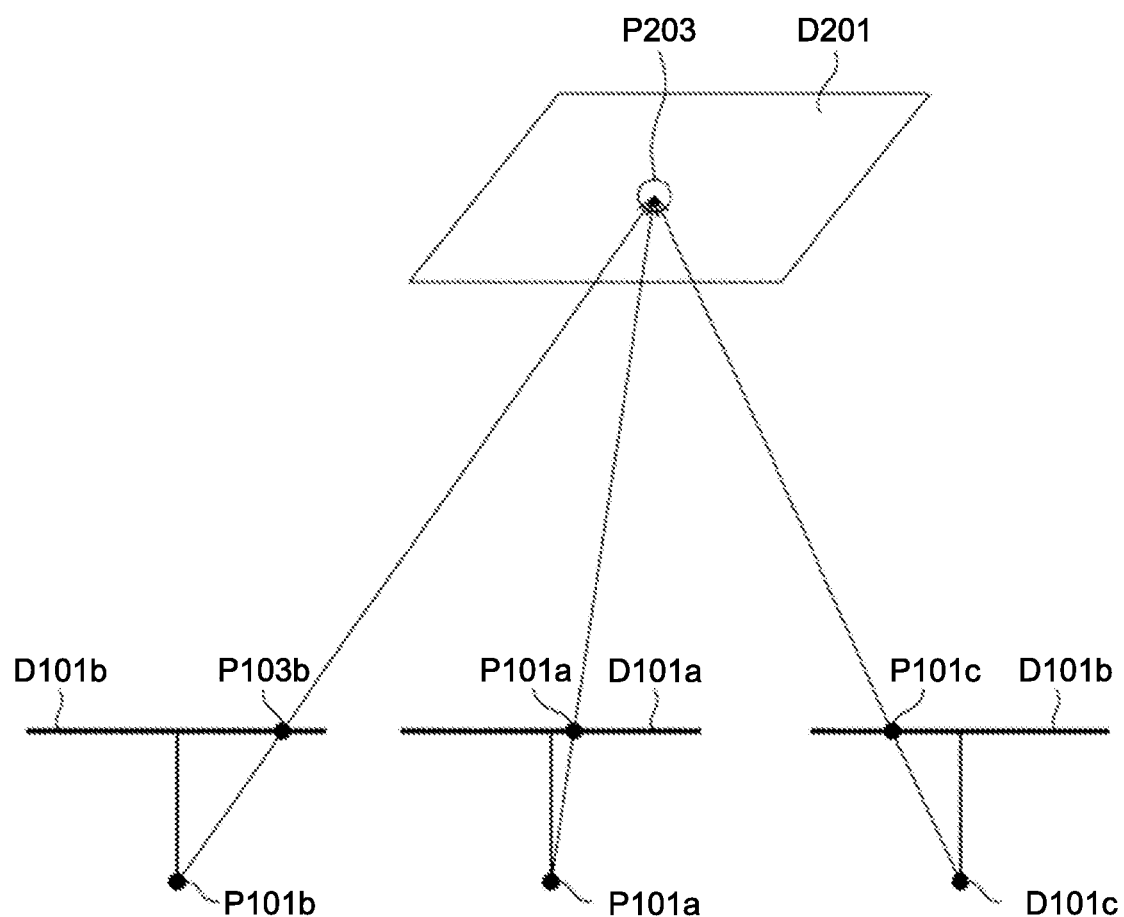
FIG. 12 is an explanatory diagram for explaining processing related to estimation of a shape of an object performed by an information processing device according to a modification.

In FIG. 12, the reference numerals D201 and P203 denote the same targets as in the example described above with reference to FIG. 9. In FIG. 12, the reference numeral P101a denotes the viewing point corresponding to the reference frame, and each of the reference numerals P101b and P101c denotes the viewing point corresponding to the observation frame. That is, the reference numeral D101a schematically denotes the image plane corresponding to the reference frame, and each of the reference numerals D101b and D101c schematically denotes the image plane corresponding to the observation frame. The reference numerals P103a, P103b, and P103c schematically denote pixels corresponding to the position of interest P203 on the respective image planes D101a, D101b, and D101c.

That is, the information processing device 100 according to the modification projects the pixel P103a corresponding to the position of interest P203 in the region of interest corresponding to the reference frame on the image planes D101b and D101c respectively corresponding to a plurality of observation frames. The information processing device 100 according to the modification calculates the sum of differences of pixel values of the pixels corresponding to the position of interest P203 between the reference frame and each of the observation frames, and calculates the cost $e(\bar{q}+\Delta q)$ based on the sum of differences. In this case, the cost $e(\bar{q}+\Delta q)$ is represented by the following computational expression represented as an (expression 4).

$$e(\bar{q} + \Delta q) = \sum_{i=1} \{I_R[u_{0i}] - I_{QA}[w_{QA}(u_{0i}, \bar{q} + \Delta q)]\}^2 + \newline \sum_{i=1} \{I_R[u_{0i}] - I_{QB}[w_{QB}(u_{0i}, \bar{q} + \Delta q)]\}^2 \quad \text{(expression 4)}$$

In the (expression 4) described above, $I_R[u_{0i}]$ represents a pixel value of the pixel P103a at the pixel position $u_{0i}$ on the image plane D101a corresponding to the reference frame. $w_{QA}(u_{0i}, \bar{q}+\Delta q)$ and $w_{QB}(u_{0i}, \bar{q}+\Delta q)$ represent respective pixel positions of the pixels P103b and P103c corresponding to the two observation frames illustrated in FIG. 12. In the present description, for convenience, $w_{QA}(u_{0i}, q^- + \Delta q)$ represents the pixel position of the pixel P103$b$ on the image plane D101$b$, and $w_{QB}(u_{0i}, q^- + \Delta q)$ represents the pixel position of the pixel P103$c$ on the image plane D101$c$. That is, $I_{QA}[w_{QA}(u_{0i}, q^- + \Delta q)]$ represents a pixel value of the pixel P103$b$ at the pixel position $w_{QA}(u_{0i}, q^- + \Delta q)$ on the image plane D101$b$. Similarly, $I_{QB}[w_{Qb}(u_{0i}, q^- + \Delta q)]$ represents a pixel value of the pixel P103$b$ at the pixel position $w_{QB}(u_{0i}, q^- + \Delta q)$ on the image plane D101$c$.

By repeatedly calculating the cost described above while changing a condition of the initial value $q^-$ of the plane normal vector, and searching for a condition for reducing the cost, the information processing device 100 may estimate the position and the orientation of the surface corresponding to the region of interest in the real space (in other words, the region parameters of the surface).

As described above, by utilizing a plurality of observation frames, it becomes possible to further improve robustness related to estimation of the position and the orientation of the surface corresponding to the region of interest in the real space as compared with a case in which only one observation frame is used.

At the time of estimation described above, the region of interest is divided as a region indicating one surface from each image plane, so that, among adjacent pixels in the region of interest, respective depths corresponding to the adjacent pixels are continuous (that is, the depths are not discontinuous). Thus, a condition related to such continuity of the depths corresponding to the respective adjacent pixels may be utilized as a constraint for calculating the cost. By applying such processing, it becomes possible to further improve robustness related to estimation of the position and the orientation of the surface corresponding to the region of interest in the real space.

As the modification of the information processing system according to the embodiment, an example of a case of utilizing a plurality of observation frames has been described above with reference to FIG. 12.

4. HARDWARE CONFIGURATION

Figure 13:
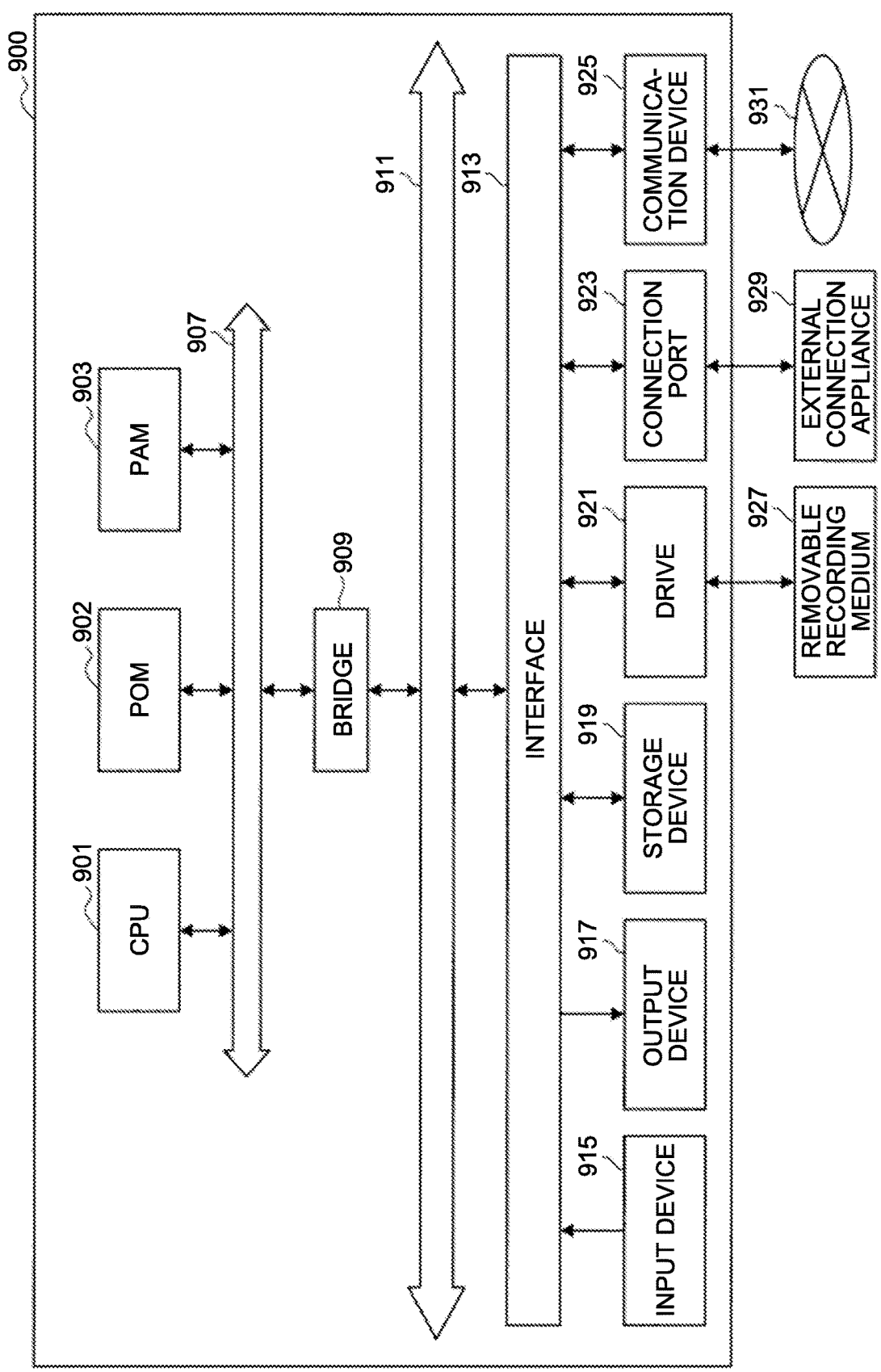
FIG. 13 is a functional block diagram illustrating a configuration example of a hardware configuration of an information processing device constituting an information processing system according to an embodiment of the present disclosure.

Subsequently, with reference to FIG. 13, the following specifically describes an example of a hardware configuration of an information processing device constituting the information processing system according to an embodiment of the present disclosure like the information processing device 100 described above. FIG. 13 is a functional block diagram illustrating a configuration example of the hardware configuration of the information processing device constituting the information processing system according to one embodiment of the present disclosure.

An information processing device 900 constituting the information processing system according to the embodiment mainly includes a CPU 901, a ROM 902, and a RAM 903. The information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the entire or part of operations in the information processing device 900 in accordance with various computer programs recorded in the ROM 902, the RAM 903, the storage device 919, or a removable recording medium 927. The ROM 902 stores a computer program, an arithmetic parameter, and the like used by the CPU 901. The RAM 903 temporarily stores a computer program used by the CPU 901, a parameter that is appropriately changed when a computer program is executed, and the like. These components are connected to each other via the host bus 907 constituted of an internal bus such as a CPU bus. For example, the preprocessing unit 101, the orientation estimation unit 103, the region division unit 105, the matching processing unit 109, the region parameter estimation unit 111, the three-dimensional model update unit 113, and the three-dimensional shape estimation unit 117 illustrated in FIG. 4 may be constituted of the CPU 901.

The host bus 907 is connected to the external bus 911 such as a Peripheral Component Interconnect/Interface (PCI) bus via the bridge 909. The input device 915, the output device 917, the storage device 919, the drive 921, the connection port 923, and the communication device 925 are connected to the external bus 911 via the interface 913.

The input device 915 is, for example, an operation unit operated by a user such as a mouse, a keyboard, a touch panel, a button, a switch, a lever, and a pedal. The input device 915 may also be, for example, a remote control unit (what is called a remote control) utilizing infrared rays or other radio waves, or an external connection appliance 929 such as a cellular telephone or a PDA supporting an operation of the information processing device 900. Additionally, for example, the input device 915 is constituted of an input control circuit and the like that generate an input signal based on information input by the user with the operation unit described above, and output the input signal to the CPU 901. The user of the information processing device 900 can input various kinds of data or provide an instruction to perform processing operation to the information processing device 900 by operating the input device 915.

The output device 917 is constituted of a device that can notify the user of acquired information visually or aurally. Examples of such a device include a display device such as a CRT display device, a liquid crystal display device, a plasma display device, an EL display device, and a lamp, a voice output device such as a speaker and a headphone, and a printer device. The output device 917 outputs, for example, a result obtained through various kinds of processing performed by the information processing device 900. Specifically, the display device displays the result obtained through various kinds of processing performed by the information processing device 900 as text or an image. On the other hand, the voice output device converts an audio signal including reproduced voice data, audio data, and the like into an analog signal to be output.

The storage device 919 is a device for data storage that is configured as an example of a storage unit of the information processing device 900. The storage device 919 is constituted of, for example, a magnetic storage unit device such as a Hard Disk Drive (HDD), a semiconductor storage device, an optical storage device, a magneto-optical storage device, or the like. The storage device 919 stores a computer program executed by the CPU 901, various kinds of data, and the like. For example, the storage unit 115 illustrated in FIG. 4 may be constituted of the storage device 919.

The drive 921 is a reader/writer for a recording medium, and is incorporated in or externally attached to the information processing device 900. The drive 921 reads out information recorded in a removable recording medium 927 such as a mounted magnetic disc, an optical disc, a magneto-optical disc, or a semiconductor memory, and outputs the information to the RAM 903. The drive 921 may also write a record in the removable recording medium 927 such as a mounted magnetic disc, an optical disc, a magneto-optical disc, or a semiconductor memory. The removable recording medium 927 is, for example, a DVD medium, an HD-DVD medium, a Blu-ray (registered trademark) medium, or the like. The removable recording medium 927 may also be a CompactFlash (CF) (registered trademark), a flash memory, a Secure Digital memory card (SD memory card), or the like. The removable recording medium 927 may also be, for example, an electronic appliance or an Integrated Circuit card (IC card) on which a contactless IC chip is mounted.

The connection port 923 is a port for direct connection to the information processing device 900. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) (registered trademark) port, and the like. When the external connection appliance 929 is connected to the connection port 923, the information processing device 900 directly acquires various kinds of data from the external connection appliance 929, or provides various kinds of data to the external connection appliance 929.

The communication device 925 is, for example, a communication interface constituted of a communication device and the like for connection to a communication network (network) 931. The communication device 925 is, for example, a wired or wireless Local Area Network (LAN), a communication card for Bluetooth (registered trademark) or Wireless USB (WUSB), and the like. The communication device 925 may be a router for optical communication, a router for Asymmetric Digital Subscriber Line (ADSL), a modem for various kinds of communication, or the like. For example, the communication device 925 can transmit/receive a signal and the like to/from the Internet or another communication appliance in accordance with a predetermined protocol such as TCP/IP. The communication network 931 connected to the communication device 925 is constituted of a network and the like that is connected in a wired or wireless manner, and may be the Internet, a domestic LAN, infrared communication, radio wave communication, or satellite communication, for example.

In the above description, exemplified is the hardware configuration that can implement the function of the information processing device 900 constituting the information processing system according to the embodiment of the present disclosure. Each of the constituent elements described above may be configured by using a versatile member, or may be configured as hardware dedicated to a function of each constituent element. Thus, the hardware configuration to be utilized can be appropriately changed depending on a technical level at each time when the embodiment is implemented. Although not illustrated in FIG. 13, various configurations corresponding to the information processing device 900 constituting the information processing system are obviously provided.

It is possible to create a computer program for implementing respective functions of the information processing device 900 constituting the information processing system according to the embodiment as described above, and implement the computer program on a personal computer and the like. A computer-readable recording medium storing such a computer program can also be provided. The recording medium is, for example, a magnetic disc, an optical disc, a magneto-optical disc, or a flash memory. The computer program described above may be distributed without using the recording medium, for example, via a network. The number of computers that are caused to execute the computer program is not limited. For example, the computer program may be executed by a plurality of computers (for example, a plurality of servers and the like) cooperating with each other.

5. APPLICATION EXAMPLE

Subsequently, the following describes an application example of a technique according to the embodiment described above. As described above, with the information processing system according to the embodiment, the three-dimensional shape of the object in the real space can be estimated more correctly without depending on patterns or designs added to the object. In view of such a characteristic, the information processing system according to the embodiment can be applied to various techniques.

Application to AR/VR

By way of specific example, the technique according to the embodiment described above can be applied to an application of Augmented Reality (AR) or Virtual Reality (VR) utilizing a head mount display or a spectacle-type wearable device. For example, focusing on AR, the three-dimensional shape of the object in the real space can be estimated more accurately, so that it becomes possible to implement representation of superimposing virtual information (for example, a virtual display, a virtual object, and the like) on the surface of the object with higher accuracy. That is, real representation is enabled as if the virtual object is actually present.

By combining the technique according to the embodiment with a 3D object recognition technique utilizing the shape of the object, representation depending on a characteristic of the object in the real space is enabled.

Additionally, interaction between the virtual object and the object in the real space can be implemented in a more preferred manner. By way of specific example, an action of walking along a floor or a wall performed by a virtual character, or an action of getting on a table or a chair performed by the character can be represented more naturally (that is, more realistically). It is also possible to superimpose a virtual window on a wall or a floor, and represent a virtual space different from a space in the real world across the window more naturally. For example, it is also possible to implement representation such that "a virtual display or canvas is disposed on a wall or a floor", "a virtual character is hidden by an object in the real space", and "a virtual ball thrown to a wall or a floor in the real space bounces off the wall or the floor" more naturally. It is also possible to superimpose and display notification information (for example, warning and the like) for attracting attention of a user on a place requiring attention such as stairs.

Specifically, the information processing system according to the embodiment has a configuration of estimating the geometric structure of the surface of the object (for example, a normal line of the surface of the object) utilizing the polarized image, and a processing load related to the estimation can be reduced as compared with a case of estimating the structure of the object based on an optical image of the object. In the information processing system according to the embodiment, a series of continuous curved surfaces is recognized as one surface through the approximation processing described above with reference to FIG. 7. Thus, in a case of reproducing the curved surface as a three-dimensional model, a data amount can be further reduced as compared with a method in the related art. Accordingly, the various kinds of processing described above can be implemented even with a device having a relatively low processing capacity or a device in which available electric power is limited (for example, a device driven by a battery) such as a head mount display or a spectacle-type wearable device.

Application to Autonomous Mobile Object

The technique according to the embodiment can also be applied to an operation or control for an autonomous mobile object such as an autonomous traveling car, a drone, and a robot.

By way of specific example, by utilizing the technique according to the embodiment, a three-dimensional model of an environment structure in the real space can be acquired. Due to this, for example, the autonomous mobile object can recognize a safe moving route including less obstacles based on the three-dimensional model, and move along the moving route. The autonomous mobile object can also recognize a shape change of steps, stairs, and the like based on the three-dimensional model, and move or perform control more appropriately for the shape change.

In a case of applying the technique to an autonomous air vehicle such as a drone, a stable landing operation can be implemented by estimating the shape of a grounding surface at the time of landing.

Application to Support for Creation

The technique according to the embodiment can also be applied to support for creation. Specifically, in a manufacturing process utilizing 3D printing and the like, the technique according to the embodiment can be applied to creation of an original model.

Application to Inspection

The technique according to the embodiment can also be applied to various kinds of inspection. Specifically, the technique according to the embodiment can be applied to detection of a partial damage or crack generated in a continuous region such as the surface of the object.

The application examples of the technique according to the embodiment have been described above.

6. CONCLUSION

As described above, the information processing device according to the embodiment divides, into one or more regions, the image plane corresponding to the viewing point in the real space on which the geometric structure information corresponding to the detection result of the respective pieces of polarized light having different polarization directions is mapped in accordance with distribution of the geometric structure information. For example, the information processing device may divide the image plane corresponding to the viewing point into one or more regions in accordance with distribution of the geometric structure information based on the imaging result of the polarized image obtained by a predetermined polarization sensor held at the viewing point. The information processing device also acquires orientation information indicating at least one of the position and the orientation of the viewing point. The information processing device assumes at least part of the regions obtained by dividing the image plane as the region of interest, and estimates the shape of the object in the real space based on pieces of the geometric structure information in the region of interest on the image planes corresponding to the respective viewing points associated with each other among the different viewing points.

With the configuration as described above, it is possible to detect physical boundaries such as a boundary between objects in the real space or a boundary between a plurality of surfaces constituting the object. Thus, the image plane described above is enabled to be divided into one or more regions with physical boundaries irrespective of whether patterns or designs are added to the surface of the object in the real space. That is, with the information processing device according to the embodiment, the three-dimensional shape of the object in the real space can be estimated more accurately (that is, more correctly) without depending on patterns or designs added to the object.

For example, the information processing device according to the embodiment estimates the geometric structure of the surface of the object based on distribution of the geometric structure information corresponding to the imaging result of the polarized image. Thus, a processing load related to the estimation can be further reduced as compared with a case of estimating the structure of the object based on an optical image of the object.

The information processing device according to the embodiment may approximate a plurality of pixels adjacent to each other on the image plane assuming that the pixels correspond to a position on the same surface of the surface region of the object in accordance with the pieces of geometric structure information corresponding to the respective pixels. Through such approximation processing, one surface having spatial continuity (specifically, one surface having different normal directions depending on a position) like a series of continuous curved surfaces can be divided from the image plane as one region. Thus, for example, in a case of reproducing the curved surfaces as a three-dimensional model, a data amount can be further reduced as compared with a method in the related art.

With reference to the attached drawings, the preferred embodiment of the present disclosure has been described above in detail, but a technical scope of the present disclosure is not limited thereto. A person ordinarily skilled in the art of the present disclosure can obviously conceive various examples of variations or modifications within a scope of technical idea described in CLAIMS, and it is obvious that these examples are also encompassed by the technical scope of the present disclosure.

The effects described in the present description are merely explanation or examples, and are not limitations. That is, the technique according to the present disclosure can exhibit another effect that is obvious to those skilled in the art from the description herein in addition to the effect described above, or in place of the effect described above.

The following configurations are also encompassed by the technical scope of the present disclosure.

(1)

An information processing device, comprising:

a division unit configured to divide, into one or more regions, an image plane corresponding to a viewing point in a real space on which geometric structure information is mapped in accordance with distribution of the geometric structure information;

an acquisition unit configured to acquire orientation information indicating at least one of a position and an orientation of the viewing point;

an extracting unit configured to extract, as a region of interest, at least part of the regions obtained by dividing the image plane; and an estimation unit configured to estimate a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions.

(2)

The information processing device according to (1), wherein the estimation unit estimates at least one of a position and an orientation of a surface corresponding to the region of interest in the real space of a surface region of the object in the real space based on cost corresponding to a difference in the geometric structure information corresponding to a pixel in the region of interest between regions of interest on the image planes corresponding to the respective viewing points associated with each other among the viewing points.

(3)

The information processing device according to (2), wherein the estimation unit specifies a second pixel by projecting a first pixel in the region of interest on the image plane corresponding to a first viewing point in the region of interest on the image plane corresponding to a second viewing point in accordance with the orientation information of each of the first viewing point and the second viewing point, and calculates the cost corresponding to a difference between the geometric structure information corresponding to the first pixel and the geometric structure information corresponding to the second pixel.

(4)

The information processing device according to (3), wherein the estimation unit calculates the cost corresponding to a difference between the geometric structure information corresponding to the first pixel and the geometric structure information corresponding to the second pixel that is specified for the second viewing point for each of a plurality of the second viewing points different from each other, and estimates at least one of the position and the orientation of the surface corresponding to the region of interest in the real space based on the cost calculated for each of the second viewing points.

(5)

The information processing device according to any one of (2) to (4), wherein the estimation unit estimates a depth of the surface corresponding to the region of interest with respect to the viewing point based on the cost.

(6)

The information processing device according to any one of (1) to (5), wherein the division unit divides the image plane into the regions by estimating a physical boundary in the real space in accordance with distribution of the geometric structure information.

(7)

The information processing device according to (6), wherein the division unit approximates a plurality of pixels adjacent to each other on the image plane assuming that the pixels correspond to a position on the same surface of a surface region of the object in accordance with pieces of the geometric structure information corresponding to the respective pixels, and divides the image plane into the regions in accordance with a result of the approximation.

(8)

The information processing device according to (7), wherein the division unit divides one surface having spatial continuity of the surface region of the object from the image plane as the one region in accordance with the result of the approximation.

(9)

The information processing device according to (8), wherein the one surface having spatial continuity is a plane or a curved surface.

(10)

The information processing device according to any one of (1) to (9), wherein the geometric structure information is calculated in accordance with light intensity of the polarized light.

(11)

The information processing device according to (10), wherein the geometric structure information is information related to a normal line of the surface of the object.

(12)

The information processing device according to any one of (1) to (11), wherein the division unit divides the image plane corresponding to the viewing point into the one or more regions in accordance with distribution of the geometric structure information based on an imaging result of a polarized image obtained by a predetermined polarization sensor held at the viewing point.

(13)

The information processing device according to (12), wherein the viewing point is configured to be movable, and the polarized image and the orientation information are acquired for each of the viewing points before and after movement.

(14)

An information processing method performed by a computer, the method comprising:

dividing an image plane on which geometric structure information is mapped into one or more regions in accordance with distribution of the geometric structure information;

acquiring orientation information indicating at least one of a position and an orientation of a viewing point for the viewing point in a real space;

extracting at least part of the regions obtained by dividing the image plane as a region of interest; and estimating a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions at the viewing point.

(15)

A computer program that causes a computer to execute:

dividing an image plane on which geometric structure information is mapped into one or more regions in accordance with distribution of the geometric structure information;

acquiring orientation information indicating at least one of a position and an orientation of a viewing point for the viewing point in a real space;

extracting at least part of the regions obtained by dividing the image plane as a region of interest; and estimating a shape of an object in the real space based on the geometric structure information in regions of interest on image planes respectively corresponding to a plurality of different viewing points associated with each other among the viewing points, wherein the geometric structure information is information corresponding to a detection result of each of a plurality of pieces of polarized light having different polarization directions at the viewing point.

REFERENCE SIGNS LIST

1 INFORMATION PROCESSING SYSTEM
100 INFORMATION PROCESSING DEVICE
101 PREPROCESSING UNIT
103 ORIENTATION ESTIMATION UNIT
105 REGION DIVISION UNIT
107 ESTIMATION UNIT
109 MATCHING PROCESSING UNIT
111 REGION PARAMETER ESTIMATION UNIT
113 THREE-DIMENSIONAL MODEL UPDATE UNIT
115 STORAGE UNIT
117 THREE-DIMENSIONAL SHAPE ESTIMATION UNIT
200 INFORMATION ACQUISITION DEVICE
210 DEPTH SENSOR
210A AND 210B IMAGING UNIT
230 POLARIZATION SENSOR

The invention claimed is:

1. An information processing device, comprising:
a division unit configured to divide, into one or more regions, an image plane corresponding to a viewing point in a real space on which geometric structure information is mapped in accordance with distribution of the geometric structure information;
an acquisition unit configured to acquire orientation information indicating at least one of a position and an orientation of the viewing point;
an extracting unit configured to extract, as a region of interest, at least part of the regions obtained by dividing the image plane; and
an estimation unit configured to estimate a shape of an object in the real space based on the geometric structure information in regions of interest on image planes respectively corresponding to a plurality of different viewing points associated with each other among the viewing points, wherein
the geometric structure information is information corresponding to a detection result of each of a plurality of pieces of polarized light having different polarization directions, and
the division unit, the acquisition unit, the extracting unit, and the estimation unit are each implemented via at least one processor.

2. The information processing device according to claim 1, wherein
the estimation unit estimates at least one of a position and an orientation of a surface corresponding to the region of interest in the real space of a surface region of the object in the real space based on cost corresponding to a difference in the geometric structure information corresponding to a pixel in the region of interest between regions of interest on the image planes corresponding to the respective viewing points associated with each other among the viewing points.

3. The information processing device according to claim 2, wherein
the estimation unit
specifies a second pixel by projecting a first pixel in the region of interest on the image plane corresponding to a first viewing point in the region of interest on the image plane corresponding to a second viewing point in accordance with the orientation information of each of the first viewing point and the second viewing point, and
calculates the cost corresponding to a difference between the geometric structure information corresponding to the first pixel and the geometric structure information corresponding to the second pixel.

4. The information processing device according to claim 3, wherein
the estimation unit
calculates the cost corresponding to a difference between the geometric structure information corresponding to the first pixel and the geometric structure information corresponding to the second pixel that is specified for the second viewing point for each of a plurality of the second viewing points different from each other, and
estimates at least one of the position and the orientation of the surface corresponding to the region of interest in the real space based on the cost calculated for each of the second viewing points.

5. The information processing device according to claim 2, wherein the estimation unit estimates a depth of the surface corresponding to the region of interest with respect to the viewing point based on the cost.

6. The information processing device according to claim 1, wherein the division unit divides the image plane into the regions by estimating a physical boundary in the real space in accordance with distribution of the geometric structure information.

7. The information processing device according to claim 6, wherein
the division unit
approximates a plurality of pixels adjacent to each other on the image plane assuming that the pixels correspond to a position on the same surface of a surface region of the object in accordance with pieces of the geometric structure information corresponding to the respective pixels, and
divides the image plane into the regions in accordance with a result of the approximation.

8. The information processing device according to claim 7, wherein the division unit divides one surface having spatial continuity of the surface region of the object from the image plane as the one region in accordance with the result of the approximation.

9. The information processing device according to claim 8, wherein the one surface having spatial continuity is a plane or a curved surface.

10. The information processing device according to claim 1, wherein the geometric structure information is calculated in accordance with light intensity of the polarized light.

11. The information processing device according to claim 10, wherein the geometric structure information is information related to a normal line of the surface of the object.

12. The information processing device according to claim 1, wherein the division unit divides the image plane corresponding to the viewing point into the one or more regions in accordance with distribution of the geometric structure information based on an imaging result of a polarized image obtained by a predetermined polarization sensor held at the viewing point.

13. The information processing device according to claim 12, wherein
the viewing point is configured to be movable, and
the polarized image and the orientation information are acquired for each of the viewing points before and after movement.

14. An information processing method performed by a computer, the method comprising:
dividing an image plane on which geometric structure information is mapped into one or more regions in accordance with distribution of the geometric structure information;
acquiring orientation information indicating at least one of a position and an orientation of a viewing point for the viewing point in a real space;
extracting at least part of the regions obtained by dividing the image plane as a region of interest; and
estimating a shape of an object in the real space based on the geometric structure information in regions of interest on image planes respectively corresponding to a plurality of different viewing points associated with each other among the viewing points, wherein
the geometric structure information is information corresponding to a detection result of each of a plurality of pieces of polarized light having different polarization directions at the viewing point.

15. A non-transitory computer-readable medium having embodied thereon a program, which when executed by a computer causes the computer to execute a method, the method comprising:
dividing an image plane on which geometric structure information is mapped into one or more regions in accordance with distribution of the geometric structure information;
acquiring orientation information indicating at least one of a position and an orientation of a viewing point for the viewing point in a real space;
extracting at least part of the regions obtained by dividing the image plane as a region of interest; and
estimating a shape of an object in the real space based on the geometric structure information in regions of interest on image planes respectively corresponding to a plurality of different viewing points associated with each other among the viewing points, wherein
the geometric structure information is information corresponding to a detection result of each of a plurality of pieces of polarized light having different polarization directions at the viewing point.

* * * * *